(12) United States Patent
Xu et al.

(10) Patent No.: US 11,871,462 B2
(45) Date of Patent: Jan. 9, 2024

(54) INTER-MENB HANDOVER METHOD AND DEVICE IN A SMALL CELL SYSTEM

(71) Applicant: Samsung Electronics Co., Ltd., Suwon-si (KR)

(72) Inventors: Lixiang Xu, Beijing (CN); Xiaowan Ke, Beijing (CN); Hong Wang, Beijing (CN)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 18/174,257

(22) Filed: Feb. 24, 2023

(65) Prior Publication Data

US 2023/0217514 A1    Jul. 6, 2023

Related U.S. Application Data

(63) Continuation of application No. 17/497,486, filed on Oct. 8, 2021, now Pat. No. 11,596,009, which is a
(Continued)

(30) Foreign Application Priority Data

Jul. 10, 2014 (CN) .......................... 201410328143.5
Mar. 26, 2015 (CN) .......................... 201510136863.6

(51) Int. Cl.
*H04W 28/08*   (2023.01)
*H04W 28/12*   (2009.01)
(Continued)

(52) U.S. Cl.
CPC ........ *H04W 76/11* (2018.02); *H04W 36/0058* (2018.08); *H04W 36/0061* (2013.01);
(Continued)

(58) Field of Classification Search
None
See application file for complete search history.

(56) References Cited

U.S. PATENT DOCUMENTS

2014/0328182 A1* 11/2014 Gao ................. H04W 28/12
                                                     370/236
2016/0088647 A1   3/2016 Yi et al.
(Continued)

FOREIGN PATENT DOCUMENTS

WO    2014/097743 A1   6/2014

OTHER PUBLICATIONS

R2-140531, MCG handover for Dual Connectivity, Feb. 9, 2014.
(Continued)

*Primary Examiner* — Gary Lafontant
(74) *Attorney, Agent, or Firm* — Jefferson IP Law, LLP

(57) ABSTRACT

An embodiment of the present disclosure may provide an inter-MeNB handover method in a small cell system, including: making, by a source MeNB and/or target MeNB, a determination as to whether to maintain a SeNB when handover is performed; and triggering different handover processes according to a result of the determination as to whether to maintain the SeNB. Another embodiment of the present disclosure may further provide an inter-MeNB handover device in a small cell system. With the inter-MeNB handover method and device in a small cell system provided by the present disclosure, unnecessary deletion and re-establishment of the bearers at the SeNB for the UE may be reduced. False bearer deletion may be avoided and data forwarding may be reduced. Furthermore, the SeNB may be maintained according to network deployment and SGW re-selection may be supported. Therefore, system capacity and transmission speed of the data may be improved.

13 Claims, 10 Drawing Sheets

Related U.S. Application Data continuation of application No. 16/902,621, filed on Jun. 16, 2020, now Pat. No. 11,147,111, which is a continuation of application No. 16/790,065, filed on Feb. 13, 2020, now Pat. No. 10,694,432, which is a continuation of application No. 15/322,042, filed as application No. PCT/KR2015/007197 on Jul. 10, 2015, now Pat. No. 10,595,243.

(51) Int. Cl.
  *H04W 76/11* (2018.01)
  *H04W 36/00* (2009.01)
  *H04W 36/08* (2009.01)
  *H04W 36/18* (2009.01)
  *H04W 36/38* (2009.01)
  *H04W 76/15* (2018.01)

(52) U.S. Cl.
  CPC ... *H04W 36/0069* (2018.08); *H04W 36/0094* (2013.01); *H04W 36/08* (2013.01); *H04W 36/18* (2013.01); *H04W 36/38* (2013.01); *H04W 76/15* (2018.02)

(56) References Cited

U.S. PATENT DOCUMENTS

| | | | |
|---|---|---|---|
| 2016/0192245 | A1 | 6/2016 | He et al. |
| 2016/0192268 | A1 | 6/2016 | Takeda et al. |
| 2016/0286449 | A1 | 9/2016 | Choi et al. |
| 2017/0111841 | A1 | 4/2017 | Henttonen et al. |

OTHER PUBLICATIONS

R2-134219, Signalling procedures for dual connectivity, Nov. 13, 2013.
R2-140135, Handling of MeNB HO and SeNB change for dual connectivity operation, Feb. 9, 2014.
R3-140288, Handover Procedures for Dual Connectivity, Feb. 9, 2014.
R2-140530, Method to use SCG during MCG handover for Dual Connectivity, Feb. 9, 2014.
R3-140053, Analysis on the Solutions for the Prioritized Scenarios of MeNB Handover, Jan. 29, 2014.
R3-150134, Handover enhancement, Feb. 8, 2015.
European Search report dated Mar. 1, 2018, issued in the European application No. 15819389.6.
European Office Action dated Jan. 20, 2020, issued in a counterpart European application No. 15 819 389.6-1212.
Huawei; 3GPP TSG-RAN WG3; MENB Mobilly Procedure, R3-140117; XP 050738558; Feb. 9, 2014.
Samsung, "Mobility Signalling in Dual Connectivity," 3GPP TSG-RAN WG3 #83, Feb. 10-14, 2014, R3-140145, Prague, Czech Republic.
NSN, Nokia Corporation, "Handover Procedure in Case of Bearer Served by MeNB and SeNB (3C)," 3GPP TSG-RAN WG3 Meeting #82, Nov. 11-15, 2013, R3-132102, San Francisco, USA.
3rd Generation Partnership Project; Technical Specification Group Radio Access Network; Evolved Universal Terrestrial Radio Access Network (E-UTRAN); Extension of Dual Connectivity in EUTRAN (Release 13), 3GPP TR 36.875, V1.0.0, Mar. 2015, Sophia Antipolis, France.
Extended European Search Rport dated Nov. 22, 2021, issued in a counterpart European Application No. 21182006.3-1212.
Fujitsu, Huawei; Outbound Multiple Handover Preparation in Relaying Networks; 3GPP TSG-RAN WG3 #71; R3-110668; Feb. 16, 2011, Taipei, Taiwan.
Samsung; SIPTO@LN and LIPA bearer deactivation for DC; 3GPP TSG-RAN WG3 Meeting #90; R3-152888; Dec. 4, 2015, Anaheim, USA.

* cited by examiner

INTER-MENB HANDOVER METHOD AND DEVICE IN A SMALL CELL SYSTEM

PRIORITY

This application is a continuation application of prior application Ser. No. 17/497,486 filed on Oct. 8, 2021, which will be issued as U.S. Pat. No. 11,596,009 on Feb. 28, 2023; which is a continuation application of prior application Ser. No. 16/902,621 filed on Jun. 16, 2020, which has issued as U.S. Pat. No. 11,147,111 on Oct. 12, 2021; which is a continuation application of prior application Ser. No. 16/790,065 filed on Feb. 13, 2020, which has issued as U.S. Pat. No. 10,694,432 on Jun. 23, 2020; which is a continuation application of prior application Ser. No. 15/322,042 filed on Dec. 23, 2016, which has issued as U.S. Pat. No. 10,595,243 on Mar. 17, 2020; and which is a U.S. National Stage application under 35 U.S.C. § 371 of an International Application No. PCT/KR2015/007197 filed on Jul. 10, 2015, which was based on and claimed the priority under 35 U.S.C. § 119(a) of a Chinese patent application number 201410328143.5 filed on Jul. 10, 2014, filed in the Chinese Intellectual Property Office, and of a Chinese patent application number 201510136863.6 filed on Mar. 26, 2015, filed in the Chinese Intellectual Property Office, the disclosure of each of which is hereby incorporated by reference herein in their entirety.

TECHNICAL FIELD

The present disclosure relates to a wireless communication technology, and more particularly, to an inter-Master enhanced Node B (MeNB) handover method and device in a small cell System.

BACKGROUND ART

Modern mobile communication tends to provide users with multimedia services transmitted at a high speed. FIG. 1 is a schematic diagram illustrating architecture of a System Architecture Evolution (SAE).

A User Equipment (UE) 101 is a terminal device for receiving data. An Evolved Universal Mobile Telecommunications System (UMTS) Terrestrial Radio Access Network (E-UTRAN) 102 is a Radio Access Network (RAN). The RAN includes a macro eNodeB/NodeB. The macro eNodeB/NodeB provides the UE with a radio network interface, with which the UE may access the radio network. A Mobile Management Entity (MME) 103 is responsible for managing a mobile context, session context and security information of the UE. A Serving GateWay (SGW) 104 mainly provides a function of a user plane. The MME 103 and SGW 104 may be located at a same physical entity. A Packet Data Network Gateway (PGW) 105 is responsible for charging and lawful interception, etc. The PGW 105 and SGW 104 may be located at a same physical entity. A Policy and Charging Rule Function (PCRF) 106 provides Quality of Service (QoS) policies and charging rules. A Serving General Packet Radio Service (GPRS) Support Node (SGSN) 108 is a network node device, which provides data transmission with routing in a Universal Mobile Telecommunications System (UMTS). A Home Subscriber Server (HSS) 109 is a home sub-system of the UE and is responsible for protecting user information. The user information includes a current position of the UE, an address of a serving node, user security information and packet data context of the UE, etc.

The Generation Partnership Project (3GPP) proposes a requirement of small cell enhancement in Rel-12. A target scenario of the small cell enhancement includes: a scenario covered by a macro cell, a scenario, which is not covered by the macro cell, indoor and outdoor enhancement, ideal and non-ideal return enhancement, as shown in FIG. 2.

In the scenario covered by the macro cell, a technology for using inter-eNB carrier aggregation is proposed. The macro cell and small cell may work at different bands. There may be two kinds of architecture of the technology for using the inter-eNB carrier aggregation. In the first kind of architecture, user plane data is separated with a Radio Access Network (RAN). In the second kind of architecture, the user plane data is separated with a Core Network (CN). In the architecture, in which the user plane data is separated with the CN, as for a bearer established in a Pico cell, the data is directly sent to the Pico cell via the SGW in the CN and the user plane data is not forwarded via the macro cell.

In the architecture of the small cell, the UE may simultaneously receive or transmit data on two eNBs, which is called dual-connectivity. In the two eNBs, only one eNB is responsible for transmitting a Radio Resource Control (RRC) message to the UE and responsible for interacting with a control plane entity of the CN which is MME. The above eNB is called a MeNB and the other eNB is called a Secondary eNB (SeNB). A cell of the UE on the MeNB is a Primary cell (Pcell) of the UE. A Radio Resource Control (RRC) message is sent to the UE via the Pcell and the other cells are Secondary cells (Scell)s. A Scell of the UE in the SeNB is a pScell. The pScell has an Uplink (UL) physical layer control channel and the other Scells do not have the UL physical layer control channel. A cell group in the MeNB is a Master Cell Group (MCG) and a cell group at the SeNB is a Secondary Cell Group (SCG). Resources of the SCG at the UE side are configured by the SeNB and the SeNB sends configurations of the UE to the MeNB via an RRC container, The MeNB sends the configurations of the UE to the UE. The MeNB does not parse the RRC container or the MeNB parses the RRC container but does not change the configurations of the RRC container.

DISCLOSURE

Technical Problem

With movement of the UE or change of channel quality, when the MeNB determines to handover a UE from the MeNB to a new eNB, the new eNB may be called a target MeNB and inter-MeNB handover may occur. In the handover process of the MeNB, all bearers (including bearers at the source MeNB and bearers at the SeNB) are handed over to the target MeNB. The drawbacks of this method are that the bearers are frequently re-configured and the dual-connectivity is not effectively utilized to increase system capacity and improve the data transmission speed provided to the UE.

In the present disclosure, following aspects are addressed: how to make a determination as to whether to maintain the SeNB; how to obtain which bearer is configured at the SeNB by the target MeNB; how to correctly configure resource for the bearer of the UE by the source MeNB and target MeNB; how to notify the SeNB by the target MeNB which UE is handed over; how to correctly notify the CN of information of bearer switch by the target MeNB to avoid that the MME may falsely release some bearers; and how to support SGW relocation in an inter-MeNB handover process.

Technical Solution

Embodiments of the present disclosure provide an inter-MeNB handover method and device in a small cell system, to enhance system capacity and transmission speed of the data.

An embodiment of the present disclosure provides an inter-MeNB handover method in a small cell system, including: determining, by a source MeNB, as to whether to maintain a secondary eNB (SeNB) when a handover is performed; and triggering a handover process based on a result of the determination as to whether to maintain the SeNB.

Another embodiment of the present disclosure provides an inter-master enhanced NodeB (MeNB) handover method in a small cell system, comprising: determining, by a target MeNB, as to whether to maintain a secondary eNB (SeNB) when a handover is performed; and triggering a handover process based on a result of the determination as to whether to maintain the SeNB.

Another embodiment of the present disclosure provides an inter-master enhanced NodeB (MeNB) handover device in a small cell system, the device comprising: a determination module configured to make a determination as to whether to maintain a secondary eNB (SeNB) when a handover is performed; and a handover module configured to trigger a different handover process according to a result of the determination as to whether to maintain the SeNB.

Another embodiment of the present disclosure provides an inter-MeNB handover method in a small cell system, including: making, by a source MeNB and/or target MeNB, a determination as to whether to maintain a Secondary enhanced NodeB (SeNB) when handover is performed; and triggering different handover processes according to a result of the determination as to whether to maintain the SeNB.

Preferably, the method for making, by the source MeNB and/or target MeNB, the determination as to whether to maintain the SeNB includes: making, by the source MeNB, the determination as to whether to maintain the SeNB; sending, by the source MeNB, a handover request message to the target MeNB if the result of the determination made by the source MeNB is maintaining the SeNB; receiving, by the source MeNB, a handover request acknowledgement message from the target MeNB. The handover request acknowledgement message includes the result of the determination as to whether to maintain the SeNB.

Preferably, the method for making, by the source MeNB and/or target MeNB, the determination as to whether to maintain the SeNB includes: sending, by the source MeNB, a handover request message to the target MeNB; receiving, by the source MeNB, a handover request acknowledgement message from the target MeNB.

The handover request acknowledgement message includes: the result of the determination as to whether to maintain the SeNB.

Preferably, the method for making, by the source MeNB and/or target MeNB, the determination as to whether to maintain the SeNB includes: making, by the source MeNB, the determination as to whether to maintain the SeNB and obtaining the result of the determination as to whether to maintain the SeNB.

Preferably, the method for making, by the source MeNB and/or target MeNB, the determination as to whether to maintain the SeNB includes: sending, by the source MeNB, a handover request message to the target MeNB; receiving, by the source MeNB, a handover request acknowledgement message from the target MeNB; the handover request acknowledgement message including: information indicating whether there is an X2 interface between the target MeNB and the SeNB or information indicating whether it is feasible to maintain the SeNB; making, by the source MeNB, the determination as to whether to maintain the SeNB according to the information in the handover request acknowledgement message at the SeNB.

Preferably, the handover request message includes one of or combination of multiple kinds of the following information: a cell Identity (ID) of a Secondary cell (Scell) of the UE at the SeNB and/or an eNB ID of the SeNB; bearers of the UE at the SeNB; whether the bearer of the UE at the SeNB are split bearer or SeNB Cell Group (SCG) bearers; a measurement result of the UE; an ID of the UE at the SeNB; and a Downlink (DL) Tunnel Endpoint Identifier (TEID) and DL transmission layer address of an X2 interface allocated by the SeNB to the split bearer.

Preferably, the method for triggering the different handover processes according to the result of the determination as to whether to maintain the SeNB includes: switching bearers from the SeNB to the target MeNB in a first handover process if the result of the determination is not maintaining the SeNB; and maintaining the bearers at the SeNB in a second handover process if the result of the determination is maintaining the SeNB.

Preferably, the method for maintaining the bearers at the SeNB includes: allocating, by the target MeNB, a DL TEID and DL transmission layer address of an interface between the target MeNB and a Serving GateWay (SGW) to split bearer at the SeNB, sending, by the target MeNB, the DL TEID and DL transmission layer address to the source MeNB via a handover request acknowledgement message, and sending, by the source MeNB, the DL TEID and DL transmission layer address to the Mobile Management Entity (MME) via a path switch request message; as for SCG bearer at the SeNB, not allocating, by the target MeNB, the DL TEID and DL transmission layer address to the SCG bearers and sending an Evolved Universal Terrestrial Radio Access Network (E-UTRAN) Radio Access Bearer (E-RAB) modification indication or enhanced path switch request message to the MME; the E-RAB modification indication or enhanced path switch request message including: a Tracking Area Identity and/or E-UTRAN Cell Global Identifier (ECGI) of a Primary cell (Pcell) of the target MeNB, and a TAI and/or ECGI of a S cell at the SeNB; and as for bearer, which is handed over to the target MeNB and in case of data forwarding is needed, allocating, by the target MeNB, a TEID and transmission layer address of an X2 interface for the data forwarding.

A Radio Resource Control (RRC) re-configuration message sent from the source MeNB to the UE does not include information instructing the UE to delete a SCG.

Preferably, when the result of the determination is maintaining the SeNB, the method further includes: making, by the target MeNB, a determination as to whether to modify configuration of bearer of the UE at the SeNB according to the configuration of the bearer of the UE made by the target MeNB and/or UE capability information, sending, by the target MeNB, an SCG configuration request message to the SeNB if a result of the determination at the SeNB is modifying the configuration of the bearer of the UE at the SeNB and sending, by the SeNB, an SCG configuration response message to the target MeNB. Preferably, the SCG configuration request message includes: an ID of the UE at the SeNB, a MeNB UE X2AP ID allocated by the target MeNB for the UE, which is used to identify the UE between the target MeNB and the SeNB, and/or a new key of the UE in a Scell calculated by the target MeNB. The SCG configuration response message includes: a RRC container configured by the SeNB and a SeNB UE X2AP ID, which is allocated by the SeNB to identify the UE between the target MeNB and the SeNB.

Preferably, when the result of the determination is maintaining the SeNB, the method further includes: sending, by the target MeNB, a UE configuration completion message to the SeNB. The UE configuration completion message includes: a MeNB UE X2AP ID between the target MeNB and the SeNB allocated by the target MeNB for the UE. If the target MeNB modified configuration of the SeNB before the target MeNB sends the UE configuration completion message to the SeNB, the UE configuration completion message includes: a SeNB UE X2AP ID, which is allocated by the SeNB to identify the UE between the target MeNB and the SeNB. If the target MeNB didn't modify the configuration of the SeNB before the target MeNB sends the UE configuration completion message to the SeNB, the UE configuration completion message comprises information, which is used by the SeNB to identify the UE. The information, which is used by the SeNB to identify the UE is a cell ID of a Scell at the SeNB and a Cell Radio Network Temporary Identifier (C-RNTI) of the UE in the Scell. If there are the SeNB multiple serving Scells at the SeNB, the information, which is used by the SeNB to identify the UE includes: multiple Pairs of cell ID of the S cell and C-RNTI; or the information, which is used by the SeNB to identify the UE is the SeNB UE X2AP ID of the UE allocated by the SeNB. When the information, which is used by the SeNB to identify the UE is the SeNB UE X2AP ID of the UE allocated by the SeNB, the UE configuration completion message further includes: the ID of the source MeNB and/or the MeNB UE X2AP ID allocated by the source MeNB.

Preferably, as for split bearer, the UE configuration completion message further includes: an E-RAB ID and a TEID and transmission layer address allocated by the target MeNB.

In a situation that an SGW is re-selected, as for SCG bearer, the UE configuration completion message further includes: a UL TEID and UL transmission layer address allocated by a new SGW.

Another embodiment of the present disclosure further provides an inter-MeNB handover device in a small cell system, including: a determination module and a handover module.

The determination module is to make a determination as to whether to maintain a Secondary enhanced NodeB (SeNB) when handover is performed; and the handover module is to trigger different handover processes according to a result of the determination as to whether to maintain the SeNB.

Advantageous Effects

It may be seen from the above technical scheme that with the inter-MeNB handover method and device in a small cell system, unnecessary deletion and re-establishment of the bearer of the UE at the SeNB may be reduced. False bearer deletion may be avoided and data forwarding may be reduced. Furthermore, whether to handover the SeNB or maintain the SeNB may be determined according to network deployment and SGW relocation may be supported. Therefore, system capacity and transmission speed of the data may be improved.

MODE FOR INVENTION

To make the objective, technical solution and the merits of the present disclosure more apparent, the present disclosure may be described in detail with reference to accompanying figures.

Figure 1:
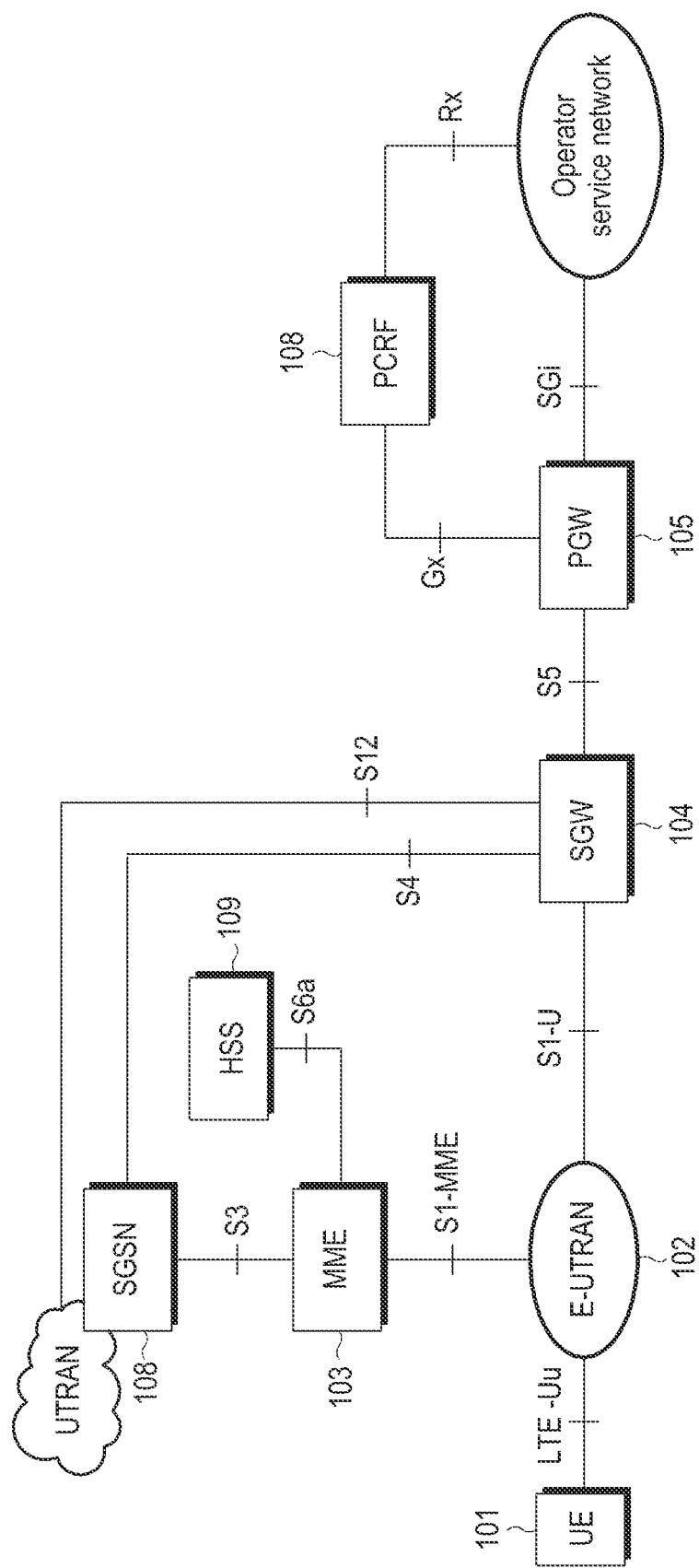
FIG. 1 is a schematic diagram illustrating architecture of a conventional SAE system.
Figure 2:
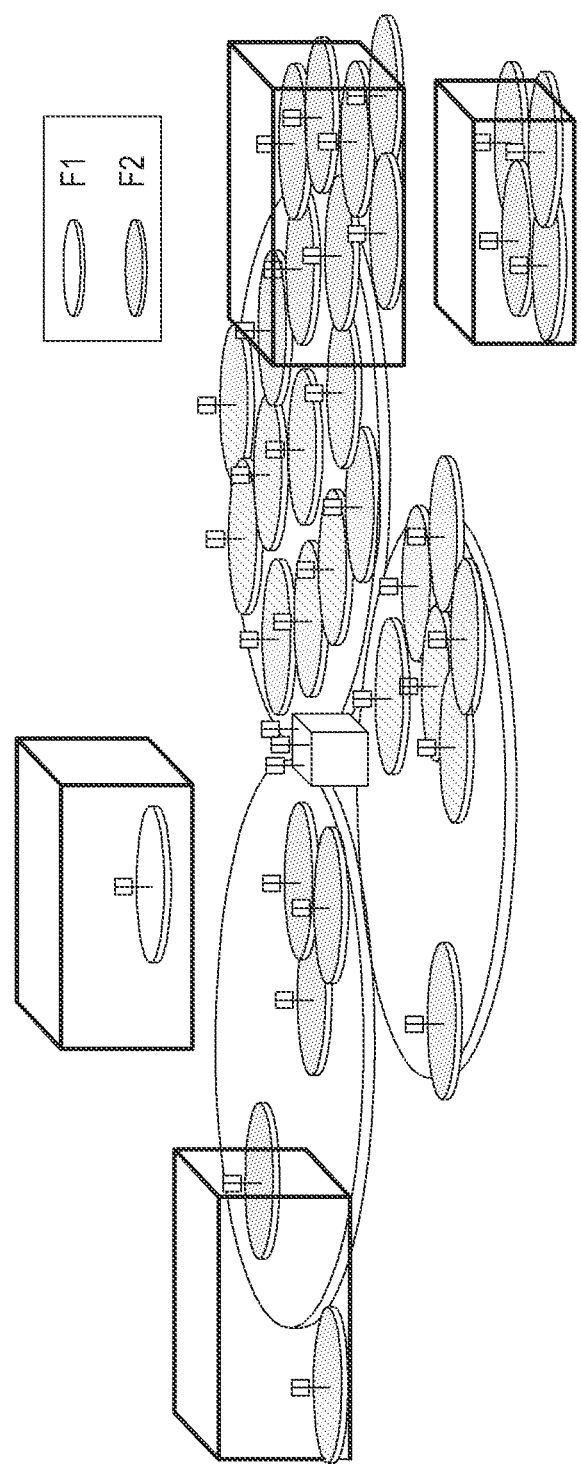
FIG. 2 is a schematic diagram illustrating an enhanced deployment scenario of the small cell.
Figure 3:
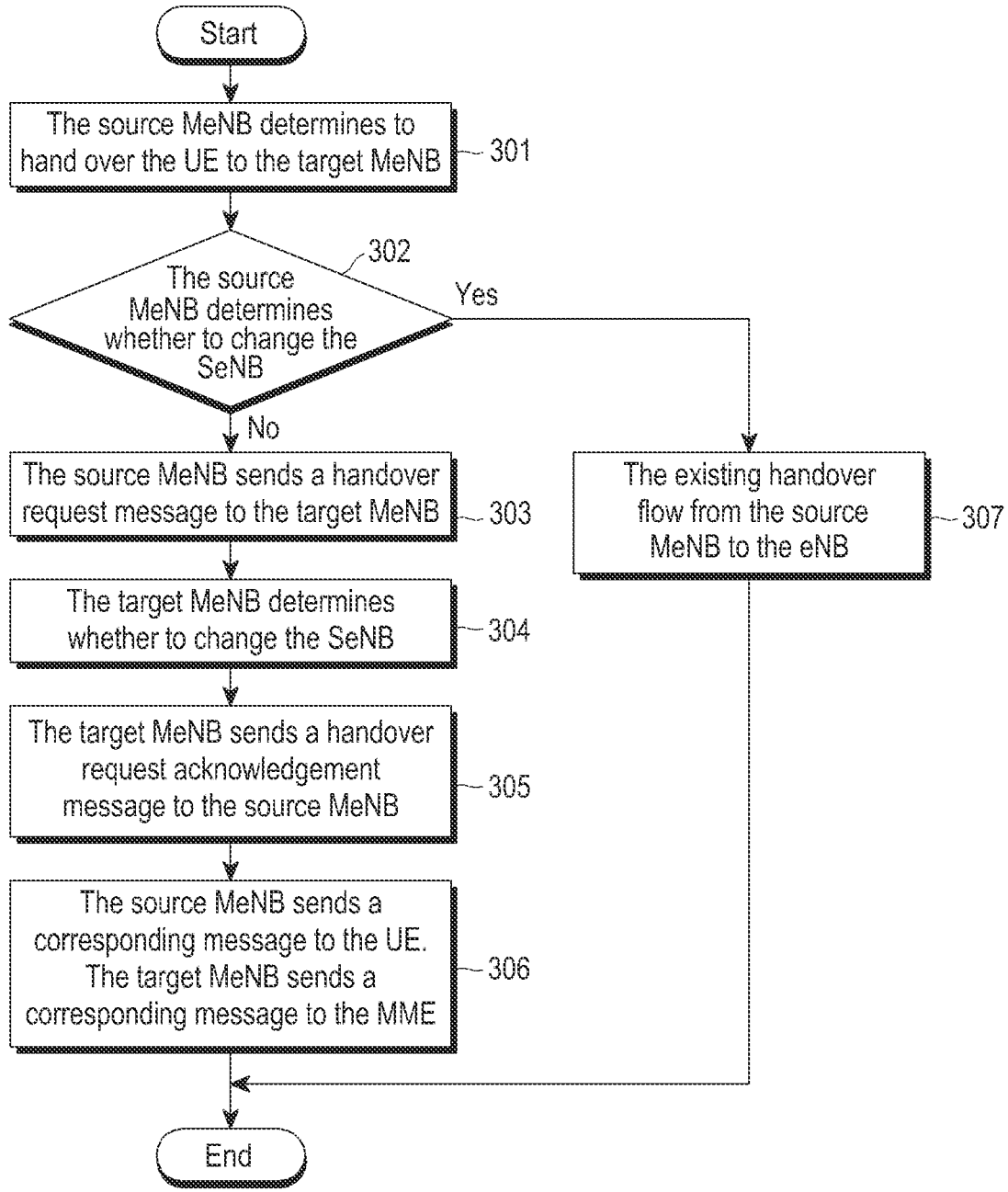
FIG. 3 is a schematic diagram illustrating inter-MeNB handover method one in a small cell system.

FIG. 3 may be a schematic diagram illustrating inter-MeNB handover method one in a small cell system. The main process of the method may include: making, by a source MeNB, a determination as to whether to maintain a SeNB and triggering different processes according to a result of the determination. If the result of the determination of the source MeNB is keeping the SeNB unchanged, a target MeNB may further make a determination as to whether to maintain the SeNB and notify the source MeNB of the result of the determination. The source MeNB may send a corresponding message to the UE. After receiving an RRC re-configuration response message from the UE, the target MeNB may send a corresponding message to the CN, so that bearer of the UE at the SeNB is kept in both UE and CN side. In the above process, both the source MeNB and target MeNB may make a determination as to whether to keep the SeNB. In order to distinguish the determinations made by the source MeNB and the target MeNB, the determination made by the source MeNB may be called an initial determination and the determination made by the target MeNB may be called a final determination. Specifically, the method shown in FIG. 3 may include following blocks.

At step 301, the source MeNB may determine to hand over the UE to the target MeNB.

At step 302, the source MeNB may make the initial determination as to whether to change the SeNB. If the source MeNB determines to hand over the bearers at the SeNB to the target MeNB, block 307 may be executed. If the source MeNB determines to keep the SeNB unchanged, block 303 may be performed.

At this step, the source MeNB may make the determination as to whether to keep the SeNB unchanged according to a UE's measurement report. For instance, if the UE's measurement report shows that signal quality of the UE in a Scell of the SeNB is good enough, the source MeNB may determine that the SeNB may be kept unchanged. If the UE's measurement report shows that the signal quality of the UE in the Scell of the SeNB is not good enough, the source MeNB may determine to hand over the bearers at the SeNB.

At step 303, the source MeNB may send a handover request message to the target MeNB.

The handover request message includes contents in the existing 3GPP specification TS36.423. For instance, the contents may include a to-be-established Evolved Radio Access Bearer (E-RAB) list, the UE's measurement report and UE capability information, etc. Each item of to-be-established E-RAB information may include: an E-RAB Identity (ID), E-RAB QoS information and UL GPRS Tunnelling Protocol (GTP) tunnel endpoint identity (TEID).

The handover request message may further include one kind of the following information or combination of multiple kinds of the following information:

- a cell ID of the Scell of the UE at the SeNB and/or an eNB ID of the SeNB.
- bearer of the UE at the SeNB. That is, which bearer of the UE is at the SeNB. Specifically, it may be denoted with different E-RAB lists. For instance, an E-RAB list which may be handed over to the target MeNB and an E-RAB list at the SeNB. In an alternative, the to-be-established E-RAB list may include all E-RAB information of the UE. An information element cell id of the Scell or an indication that the bearer is at the SeNB may be added to the to-be-established E-RAB information. The bearer information at the SeNB may include the new information element, while the E-RAB information, which is to be handed over to the target MeNB, may not include the new information element. The target MeNB may obtain which bearer of the UE is at the SeNB with the above two methods. As for split bearers, since a bearer may not only consume resources at the MeNB, but also consume resources at the SeNB, the latter method may have significant advantages:
- whether the bearer of the UE at the SeNB is split bearer or secondary cell group (SCG) bearer. The target MeNB may obtain whether the bearer at the SeNB is the split bearer or SCG bearer with the new information element.
- the UE's measurement report;
- the ID of the UE at the SeNB. The ID of the UE at the SeNB may be the cell ID of the Scell of the UE at the SeNB and Cell Radio Network Temporary Identifier (C-RNTI) of the UE in the Scell. The ID of the UE at the SeNB may be an X2 Application Protocol (X2 AP) ID of the UE over an interface between the source MeNB and the SeNB which includes an SeNB UE X2 AP ID allocated by the SeNB, and/or an MeNB UE X2AP ID allocated by the source MeNB and/or an ID of the source MeNB.
- a DL Tunnel Endpoint Identifier (TEID) and a DL transmission layer address of an X2 interface allocated by the SeNB to the split bearer.

At step 304, the target MeNB may make a determination as to whether to change the SeNB.

At this step, the target MeNB may make a determination as to whether to change the SeNB according to the UE's measurement report, ID of the SeNB or ID of the Scell at the SeNB received from the source MeNB. For instance, the target MeNB may make a determination as to whether there is an X2 interface between the target MeNB and the SeNB according to the eNB ID of the SeNB or the cell ID of the Scell at the SeNB. If there is an X2 interface and the UE's measurement report received from the MeNB shows that e.g the signal of the Scell at the SeNB is good enough, the target MeNB may determine to keep the SeNB unchanged. If there is no X2 interface between the target MeNB and SeNB or the UE's measurement report received from the MeNB shows that e.g. the signal of the Scell at the SeNB is not good enough, the target MeNB may determine not to maintain the SeNB. The target MeNB may take account of other factors (such as O&M configuration) without affecting the main contents of the present disclosure.

If the SeNB is not changed, bearer originally established at the SeNB may not be handed over to the target MeNB and still kept at the SeNB. Therefore, frequent bearer deletion and bearer establishment processes may not be needed. After the handover of the MeNB, the dual-connectivity may continue to be used, which may enhance speed for transmitting data to the UE.

When the bearer at the SeNB is maintained and not handed over, the target MeNB may determine to modify the configuration of the bearer of the UE at the SeNB according to the configuration of the UE made by the target MeNB and/or UE capability information and/or other information, etc. If the target MeNB determines to modify the configuration of the bearer at the SeNB, the target MeNB may send an SCG configuration request message to the SeNB. The target MeNB may obtain the SeNB of the UE according to the cell ID of the Scell of the UE at the SeNB and/or the ID of the SeNB in the handover request message in block 303. The SCG configuration request message may include the ID of the UE at the SeNB. The ID of the UE at the SeNB is the same as that in block 303, without going into the details. The SCG configuration request message may further include the MeNB UE X2AP ID allocated by the target MeNB for the UE. The MeNB UE X2AP ID is used to identify the UE between the target MeNB and SeNB. The SCG configuration request message may be the existing SeNB modification request message or a new message. The SCG configuration request message may further include a new key of the UE in the S cell calculated by the target MeNB. The SeNB may send an SCG configuration response message to the target MeNB. The SCG configuration response message may include a Radio Resource Control (RRC) container containing the updated air interface configuration by the SeNB. The SCG configuration response message may further include a SeNB UE X2AP ID, which may be allocated by the SeNB and used to identify the UE between the target MeNB and the SeNB.

At step 305, the target MeNB may send a handover request acknowledgement message to the source MeNB. The handover request acknowledgement message may include information indicating whether to maintain the SeNB unchanged. The target MeNB may allocate a DL TEID and DL transmission layer address of an S1 interface (an interface between the target MeNB and the SGW) to the bearer handed over to the target MeNB.

The target MeNB knows which bearer of the UE is at the SeNB and whether the bearer at the SeNB is split bearer or SCG bearer according to the information of bearer at the SeNB (i.e. which bearer are at the SeNB) and the information indicating whether the bearer at the SeNB is the split bearer or the SCG bearer in the handover request message received from the source MeNB at step 303. The target MeNB may allocate a DL TEID and transmission layer address of an interface between the target MeNB and SGW to the split bearer. As for the SCG bearer, if the target MeNB determines to keep the SeNB unchanged, the target MeNB may not need to allocate DL TEID and DL transmission layer address to the SCG bearer. If the target MeNB determines to handover the bearer at the SeNB to the target MeNB, the target MeNB may allocate the DL TEID and DL transmission layer address of the S1 interface to the SCG bearer.

As for the bearer which may be handed over to the target MeNB and in need of data forwarding, the target MeNB may allocate the TEID and transmission layer address of the X2 interface, which may be used for data forwarding.

The TEID and transmission layer address allocated by the target MeNB to each bearer of the UE may be sent to the source MeNB via the handover request acknowledgement message.

The target MeNB may allocate air interface resource to the bearer handed over to the target MeNB and send the configuration of the air interface to the source MeNB via the RRC container (i.e. the RRC container from the target MeNB).

As for the situation that the bearer at the SeNB is kept unchanged, if the target MeNB modifies the configuration at the SeNB and receives the RRC container from the SeNB, the target MeNB may send the RRC container from the SeNB to the source MeNB via the handover request acknowledgement message.

At step 306, the source MeNB may send a corresponding message to the UE. The source MeNB may send an RRC re-configuration message to the UE. The RRC re-configuration message may include configuration information of the bearers handed over to the target MeNB, i.e. the RRC container from the target MeNB.

If the source MeNB receives from the target MeNB the information indicating not to handover the SeNB, the RRC re-configuration message may not include information instructing the UE to delete the SCG. In the situation that the SeNB may not be handed over, the source MeNB may modify the configuration of the SCG according to the information received from the target MeNB and send the RRC container from the SeNB to the UE.

If the source MeNB receives from the target MeNB the information indicating handover the SeNB, the source MeNB may instruct the UE to delete the SCG while re-configuring the MCG and establish the bearers at the source SCG to the target MeNB.

In a situation that the SeNB may be handed over, before the source MeNB sends the RRC re-configuration message to the UE, the source MeNB may send a SeNB deletion request to the SeNB and notify the SeNB of the TEID and transmission layer address of the data forwarding via the SeNB deletion request. This process may be an existing process and may not be main content of the present disclosure. The detailed technology description may be omitted.

The UE may send the RRC re-configuration response message to the target MeNB.

The target MeNB may send a corresponding message to the MME.

In a situation that the SeNB may be handed over, the target MeNB may send a path switch request message to the MME. The path switch request message may include the DL TEID and DL transmission layer address allocated by the target MeNB to each bearer.

In a situation that the SeNB may not be changed and the bearer at the SeNB is the split bearer, the target MeNB may send the path switch request message to the MME. The path switch request message may include the DL TEID and DL transmission layer address allocated by the target MeNB to each bearer.

In a situation that the SeNB may not be changed and the bearer at the SeNB is the SCG bearer, the target MeNB may send an Evolved Universal Terrestrial Radio Access Network (E-UTRAN) Radio Access Bearer (E-RAB) modification indication to the MME or send an enhanced path switch request message to the MME. The enhanced path switch request message is not a name of a message. The enhanced path switch request message means adding a new information element to the existing path switch request message or the behavior of the MME may be different from that of the MME in the prior art after the MME receives the enhanced path switch request message. The E-RAB modification indication or the enhanced path switch request message may further include a Tracking Area Identity (TAI) and/or E-UTRAN Cell Global Identifier (ECGI) of the Pcell of the target MeNB, and may further include: the TAI and/or ECGI of the Scell of the SeNB.

The E-RAB modification indication message may trigger establishment of UE association S1 signaling connection between the target MeNB and the MME. The E-RAB modification indication message may include an MME UE S1AP ID of the UE at the MME. The E-RAB modification indication message may include an eNB UE S1AP ID allocated by the target MeNB. The E-RAB modification indication message may include information of bearer to be handed over. The information of bearer maintained at the SeNB may not need to be included in the E-RAB modification indication message. After the MME receives the E-RAB modification indication message, the UE association S1 signaling connection between the target MeNB and the MME may be established. As for E-RAB, which may not be included in the E-RAB modification indication message, the MME may maintain the E-RAB and may not release the E-RAB. The MME may send a modify bearer request message to the SGW to request for modifying the handed over bearer. After the MME receives a modify bearer response message from the SGW, the MME may send an E-RAB modification indication acknowledgement message to the target MeNB. The E-RAB modification indication acknowledgement message may include security context information, which may be used to update a key between the target MeNB and the UE. After the MME receives the E-RAB modification indication message, the MME may further make a determination as to whether to re-select a SGW. When the MME makes the determination as to whether to re-select the SGW, the MME may consider the TAI of the Pcell of the target MeNB, or may consider the TAI of the Pcell of the target MeNB and the S cell of the SeNB simultaneously. If SGW relocation is needed, the MME may send a create session request message to the destination SGW. The create session request message may include all bearers of the UE i.e. the bearer received from the target MeNB which may need to be handed over, and the bearer which may not need to be handed over. The MME may know the information of the bearer, which may not need to be handed over, according to stored UE context. The destination SGW may allocate a UL TEID and UL transmission layer address for each bearer. The destination SGW may send a create session response message to the MME. The MME may send an E-RAB modification indication acknowledgement message to the target MeNB. In case of SGW relocation, the E-RAB modification indication acknowledgement message may not only include the UL TEID and UL transmission layer address of the handed over bearer, but also include the UL TEID and UL transmission layer address of the bearer which may not be handed over Similar to the situation without SGW relocation, the E-RAB modification indication acknowledgement message may include the security context, which may be used to update the key between the target MeNB and the UE.

The enhanced path switch request may include all the bearers e.g. the bearer which may need to be handed over and the bearer which may not need to be handed over. After the MME receives the enhanced path switch request, as for the bearer which may not need to be handed over (such as, the TEID and transmission layer address of the bearer are not changed), the MME may not take the enhanced path switch request as an error message and not trigger a de-activation process of the bearer. If the TEID and transmission layer address of a bearer is not changed, the MME get to know that the bearer is not handed over. In an alternative, the enhanced path switch request may include indication information. The indication information may indicate the bearer which may not be included in the path switch request message, may not be released. After the MME receives the enhanced path switch request message, the MME may not trigger the de-activation process of the bearer, which may not be included in the path switch request message according to the indication information. The MME may send the modify bearer request message to the SGW to request for modifying the handed over bearers. After the MME receives the modify bearer response message from the SGW, the MME may send the path switch request acknowledgement message to the target MeNB. After the MME receives the path switch request message, the MME may make a determination as to whether to re-select the SGW. When the MME makes the determination as to whether to re-select the SGW, the MME may consider the TAI of the Pcell of the target MeNB, or may simultaneously consider that TAI of the Pcell of the target MeNB and the TAI of the Scell of the SeNB. If SGW relocation is needed, the MME may send the create session request message to the destination SGW. The create session request message may include all the bearers of the UE i.e. the bearer received from the target MeNB which may need to be handed over, and the bearer which may not need to be handed over. The destination SGW may allocate the UL TEID and transmission layer address for each bearer. The destination SGW may send the create session response message to the MME. The MME may send the path switch request acknowledgement message to the target MeNB. In case of SGW relocation, the path switch request acknowledgement message may not only include the UL TEID and UL transmission layer address of the handed over bearer, but also include the UL TEID and UL transmission layer address of the bearer which may not be handed over.

The target MeNB may send a UE configuration completion message to the SeNB. The UE configuration completion message may include the MeNB UE X2AP ID between the target MeNB and the SeNB allocated by the target MeNB for the UE. If before this block (such as block 304), the target MeNB changed the configuration of the SeNB, the UE configuration completion message may include the SeNB UE X2AP ID, which may be allocated by the SeNB to identify the UE between the target MeNB and the SeNB.

If there is no configuration change procedure between the target MeNB and the SeNB before this block (such as block 304), the UE configuration completion message may include information which is used by the SeNB to identify the UE. Then the SeNB can know for which UE there is inter-MeNB handover. The information, which is used by the SeNB to identify the UE, may be received from the source MeNB. The information, which may be used by the SeNB to identify the UE, may include the cell ID of the S cell at the SeNB and the Cell Radio Network Temporary Identifier (C-RNTI) of the UE in the Scell. If there are multiple serving Scells at the SeNB, multiple pairs of cell ID of the Scell and C-RNTI may be included in the information. The information, which is used by the SeNB to identify the UE, may be the SeNB UE X2AP ID of the UE allocated by the SeNB. In case the information, which is used by the SeNB to identify the UE including the SeNB UE X2AP ID, it may further include the ID of the source MeNB and/or the MeNB UE X2AP ID allocated by the source MeNB besides the SeNB UE X2AP ID of the UE allocated by the SeNB. A UE associated X2 signaling connection between the target MeNB and the SeNB may be established with this process.

As for the split bearer, the UE configuration completion message may further include an E-RAB ID, the TEID and transmission layer address allocated by the target MeNB. In case of SGW relocation, as for the SCG bearer, the UE configuration completion message may further include: the UL TEID and UL transmission layer address allocated by a new SGW. The SeNB may store information received from the target MeNB and delete relevant information of the source MeNB. If the SeNB receives a new Key from the target MeNB, the SeNB may update the used key.

The source MeNB makes the target MeNB know the SeNB of the UE and the information to identify the UE at the SeNB via the step 303. So the target MeNB can send a message to a correct SeNB. The target MeNB may send the information for identifying the UE at the SeNB to the SeNB. The SeNB can know for which UE there is inter-MeNB handover. The SeNB may perform correct modification and deletion to solve the above problem four put forwarded in the present disclosure.

*118 optionally, the SeNB may further send the UE configuration completion acknowledgement message to the target MeNB.

The target MeNB may obtain the DL TEID and DL transmission layer address of the X2 interface allocated by the SeNB to the split bearer via two methods.

Method one: The source MeNB may notify the target MeNB of the DL TEID and DL transmission layer address of the X2 interface allocated by the SeNB for the split bearer via block 303.

Method two: the SeNB may send the DL TEID and DL transmission layer address of the X2 interface allocated by the SeNB to the split bearer via the UE configuration completion acknowledgement message.

Therefore, the target MeNB may send DL data to the SeNB.

At step 307, the source MeNB may execute a handover process from the source MeNB to the target MeNB and hand over the bearer at the SeNB to the target MeNB. This flow may be the same as the existing handover process from the MeNB to the eNB and may not be emphasis of the present disclosure. Therefore, detailed technical description may be omitted.

In the method shown in FIG. 3, the source MeNB may make an initial determination as to whether to maintain the SeNB and the target MeNB may make a final determination as to whether to maintain the SeNB. Therefore, in the situation that the SeNB may not be handed over, it may be ensured that the bearer at the SeNB is not released incorrectly in both the UE side and the CN side, the deletion and re-establishment of the bearers at the SeNB may be avoided, the SGW relocation may be supported and the six technical problems mentioned above may be solved.

Figure 4:
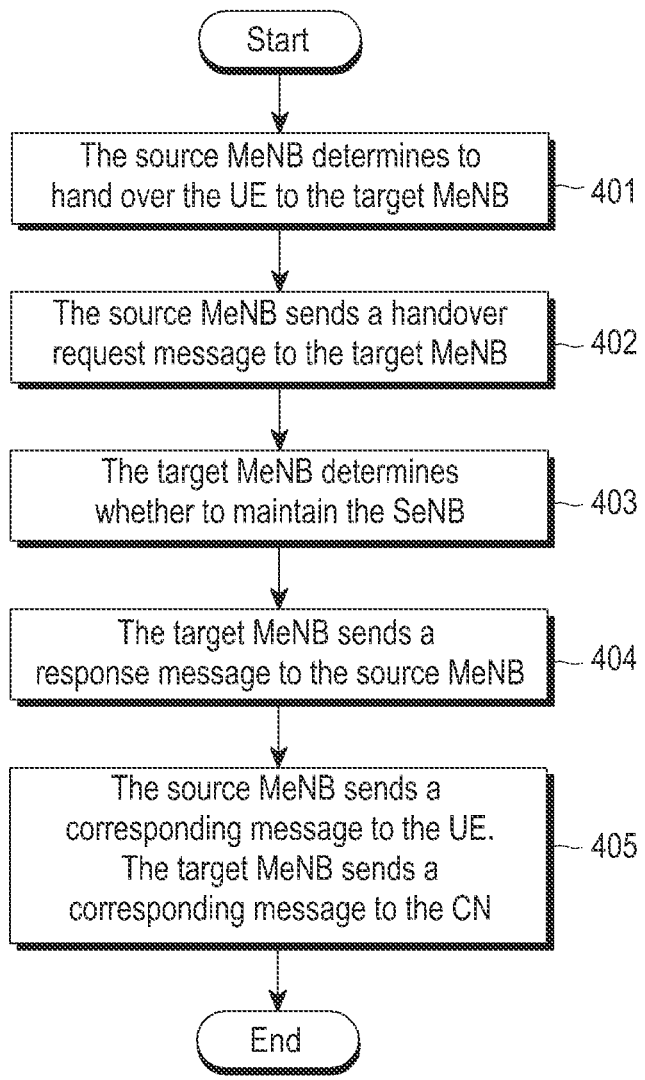
FIG. 4 is a schematic diagram illustrating inter-MeNB handover method two in a small cell system.

FIG. 4 may be a schematic diagram illustrating inter-MeNB handover method two in a small cell system. The main process of the method may include that a source MeNB may send a handover request message to a target MeNB. The target MeNB may make a determination as to whether to maintain a SeNB and notify the source MeNB of the result of the determination. The source MeNB may send a corresponding message to the UE. After the target MeNB receives an RRC re-configuration response message from the UE, the target MeNB may send a corresponding message to the CN, so that the bearer of the UE at the SeNB may be maintained and may not be released in both UE side and CN. The handover request and handover response may respectively be an enhanced handover request and enhanced handover response message. The enhancement here doesn't mean a name of the message, but means that a new information element may be added to the exiting handover request and handover response message. Specifically, the method shown in FIG. 4 may include following steps.

At step 401, the source MeNB may determine to hand over the UE to the target MeNB.

Step 402 to step 405 may be the same as step 303 to step 306, without going into the details.

With the above method shown in FIG. 4, the target MeNB may make a determination as to whether to maintain the SeNB. In the situation that the SeNB may be maintained and may not be handed over, it may be ensured that the bearer of the UE at the SeNB may not be falsely released in both UE side and CN side. The deletion and re-establishment of bearer at the SeNB may be avoided, the SGW relocation may be supported and the six technical problems mentioned above may be solved.

Figure 5:
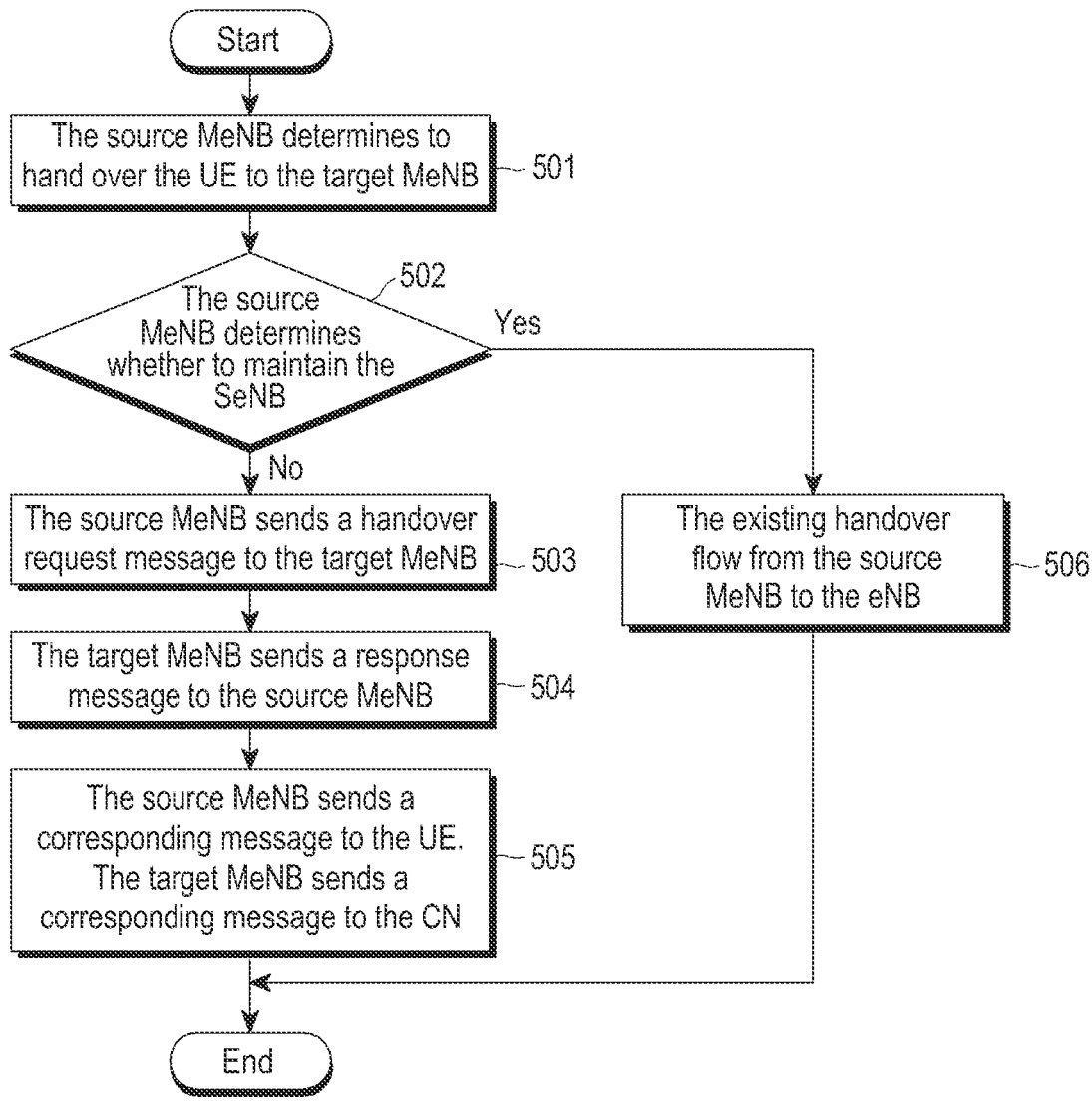
FIG. 5 is a schematic diagram illustrating inter-MeNB handover method three in a small cell system.

FIG. 5 may be a schematic diagram illustrating inter-MeNB handover method three in a small cell system. The main process of the method may include: making, by a source MeNB, a determination as to whether to maintain a SeNB and executing a corresponding process if the determination is yes. The bearer of the UE at the SeNB, which is not handed over, may be maintained and may not be released in both UE side and network side. The bearer, which is not handed over, may not need to be deleted and re-established. Specifically, the method shown in FIG. 5 may include following steps.

At step 501, the source MeNB may determine to hand over the UE to the target MeNB.

At step 502, the source MeNB may make a determination as to whether to maintain the SeNB. If the source MeNB determines to hand over the bearer at the SeNB to target MeNB, block 506 may be executed. If the source MeNB determines to keep the SeNB unchanged, block 503 may be performed.

At this step, the source MeNB may make the determination as to whether to change the SeNB according to the UE's measurement report. For instance, if the UE's measurement report shows that signal quality of the UE in a Scell of the SeNB is good enough, the source MeNB may determine that the SeNB may be kept unchanged. If the UE measure result shows that the signal quality of the UE in the Scell of the SeNB is not good enough, the source MeNB may determine to handover the bearer at the SeNB.

The source MeNB may make a determination as to whether to change the SeNB according to the UE's measurement report and whether there is an X2 interface between the target MeNB and the SeNB. For instance, if the UE's measurement report shows that the signal quality of the Scell at the SeNB is good enough and there is an X2 interface between the target MeNB and the SeNB, the source MeNB may determine that the SeNB may be kept unchanged. If the UE's measurement report shows that the signal quality of the Scell at the SeNB is not good enough or there is no an X2 interface between the target MeNB and the SeNB, the source MeNB may determine to hand over the bearer at the SeNB. The source MeNB may obtain whether there is an X2 interface between the target MeNB and the SeNB according to the configuration. The source MeNB may obtain whether there is an X2 interface between the target MeNB and the SeNB according to other methods without affecting the main content of the present disclosure.

When the source MeNB makes the determination, other factors (such as O&M configuration) may be considered, without affecting the main content of the present disclosure.

Step 503 may be the same as step 303, which may not be repeated here.

At step 504, the target MeNB may send a handover request acknowledgement message to the source MeNB.

The target MeNB may allocate a DL TEID and DL transmission layer address of an S1 interface (an interface between the target MeNB and the SGW) to the bearer handed over to the target MeNB. The target MeNB knows which bearer of the UE is at the SeNB and whether the bearer at the SeNB is split bearer or SCG bearer according to the information of bearer at the SeNB (i.e. which bearer are at the SeNB) and information indicating whether the bearer at the SeNB is the split bearer or the SCG bearer in the handover request message received from the source MeNB at step 503. The target MeNB may allocate a DL TEID and DL transmission layer address of an interface between the target MeNB and SGW to the split bearer. As for the SCG bearer, the target MeNB may not need to allocate the DL TEID and DL transmission layer address to the bearer. As for the bearer, which may be handed over to the target MeNB and in need of data forwarding, the target MeNB may allocate the TEID and transmission layer address of the X2 interface for data forwarding.

The TEID and transmission layer address allocated by the target MeNB to each bearer of the UE may be sent to the source MeNB via the handover request acknowledgement message.

Before the target MeNB sends the handover request acknowledgement message to the source MeNB, the target MeNB may determine to modify the configuration of the bearer of the UE at the SeNB according to the configuration of the UE made by the target MeNB and/or UE capability information and/or other information, etc. If the target MeNB determines to modify the configuration of the bearer at the SeNB, the target MeNB may send an SCG configuration request message to the SeNB. The target MeNB may obtain the SeNB of the UE according to the cell ID of the S cell of the UE at the SeNB and/or the ID of the SeNB in the handover request message in step 503. The SCG configuration request message may include the ID of the UE at the SeNB. The ID of the UE at the SeNB is the same as that in block 303, without going into the details. The SCG configuration request message may further include the MeNB UE X2AP ID allocated by the target MeNB for the UE and used to identify the UE between the target MeNB and SeNB. The SCG configuration request message may be the existing SeNB modification request message or a new message. The SCG configuration request message may further include a new key of the UE in the Scell calculated by the target MeNB. The SeNB may send an SCG configuration response message to the target MeNB. The SCG configuration response message may include a Radio Resource Control (RRC) container containing the updated air interface configuration by the SeNB. The SCG configuration response message may further include a SeNB UE X2AP ID, which may be allocated by the SeNB and used to identify the UE between the target MeNB and the SeNB.

The target MeNB may allocate the air interface resource to the bearer handed over to the target MeNB and send the configuration of the air interface to the source MeNB via the RRC container (i.e. the RRC container from the target MeNB)

As for the situation that the bearer at the SeNB is kept unchanged, if the target MeNB modifies the configuration at the SeNB and receives the RRC container from the SeNB, the target MeNB may send the RRC container sent from the SeNB to the source MeNB via the handover request acknowledgement message.

At step 505, the source MeNB may send a corresponding message to the UE. The source MeNB may send an RRC re-configuration message to the UE. The RRC re-configuration message may include configuration information of the bearer handed over to the target MeNB, i.e. the RRC container sent from the target MeNB.

If the source MeNB determines not to hand over the bearer at the SeNB, the RRC re-configuration message may not include information instructing the UE to delete the SCG. In the situation that the SeNB may not be handed over, the source MeNB may modify the configuration of the SCG according to the information received from the target MeNB and send the RRC container sent from the SeNB to the UE.

If the source MeNB determines to hand over the bearer at the SeNB, the source MeNB may indicate the UE to delete the SCG while re-configuring the MCG and establish the bearers at the source SCG to the target MeNB.

In a situation that the SeNB may be handed over, before the source MeNB sends the RRC re-configuration message to the UE, the source MeNB may send a SeNB deletion request to the SeNB and notify the SeNB of the TEID and transmission layer address for the data forwarding via the SeNB deletion request. This process may be an existing process and may not be main content of the present disclosure. The detailed technology description may be omitted.

The UE may send the RRC re-configuration response message to the target MeNB.

The target MeNB may send the corresponding message to the MME. The specific process between the target MeNB and the MME and the process between the MME and the SGW is the same as those described at step 306, without going into the details here.

The target MeNB may send a UE configuration completion message to the SeNB. The UE configuration completion message may include the MeNB UE X2AP ID between the target MeNB and the SeNB, which is allocated by the target MeNB to the UE. If before this block (such as block 504), the target MeNB changes the configuration of the SeNB, the UE configuration completion message may include the SeNB UE X2AP ID allocated by the SeNB, which is used to identify the UE between the target MeNB and the SeNB.

If there is no configuration change procedure between the target MeNB and the SeNB before this block (such as block 504), the UE configuration completion message may include information which is used by the SeNB to identify the UE. Then, the SeNB can know for which UE there is inter-MeNB handover. The information, which is used by the SeNB to identify the UE, may be received from the source MeNB. The information, which may be used by the SeNB to identify the UE, may include the cell ID of the Scell at the SeNB and the Cell Radio Network Temporary Identifier (C-RNTI) of the UE in the Scell. If there are multiple serving Scells at the SeNB, multiple pairs of cell ID of the Scell and C-RNTI may be included in the information, which may be used by the SeNB to identify the UE. The information, which is used by the SeNB to identify the UE is the SeNB UE X2AP ID of the UE allocated by the SeNB. The information, which is used by the SeNB to identify the UE, may further include the ID of the source MeNB and/or the MeNB UE X2AP ID allocated by the source MeNB besides the SeNB UE X2AP ID of the UE allocated by the SeNB. A UE associated X2 signaling connection between the target MeNB and the SeNB may be established with this process.

As for the split bearer, the UE configuration completion message may further include an E-RAB ID, the TEID and transmission layer address allocated by the target MeNB. In case of SGW relocation, as for the SCG bearer, the UE configuration completion message may further include: the UL TEID and UL transmission layer address allocated by a new SGW. The SeNB may store information received form the target MeNB and delete relevant information of the source MeNB. If the SeNB receives a new Key from the target MeNB, the SeNB may update the used key.

The source MeNB may makes the target MeNB know the SeNB of the UE and the information to identify the UE at the SeNB via the step 503. So the target MeNB can send a message to a correct SeNB. The target MeNB may send the information for identifying the UE at the SeNB to the SeNB. The SeNB can know for which UE there is inter-MeNB handover. The SeNB may perform correct modification and deletion to solve the above problem four put forwarded in the present disclosure.

Optionally, the SeNB may further send the UE configuration completion acknowledgement message to the target MeNB.

The target MeNB may obtain the DL TEID and DL transmission layer address of the X2 interface allocated by the SeNB to the split bearers via two methods.

Method one: The source MeNB may notify the target MeNB of the DL TEID and DL transmission layer address of the X2 interface allocated by the SeNB for the split bearer via block 503.

Method two: the SeNB may send the DL TEID and DL transmission layer address of the X2 interface allocated by the SeNB to the split bearer via the UE configuration completion acknowledgement message.

Therefore, the target MeNB may send DL data to the SeNB.

Block 506 may be the same as block 307, without going into the details.

In the method shown in FIG. 5, the source MeNB may make a determination as to whether to maintain the SeNB. In the situation that the SeNB may not be handed over, it may be ensured that the bearer of the UE at the SeNB is not released incorrectly in both the UE side and the CN side, the deletion and re-establishment of the bearers at the SeNB may be avoided, the SGW relocation may be supported and the six technical problems mentioned above may be solved.

Figure 6:
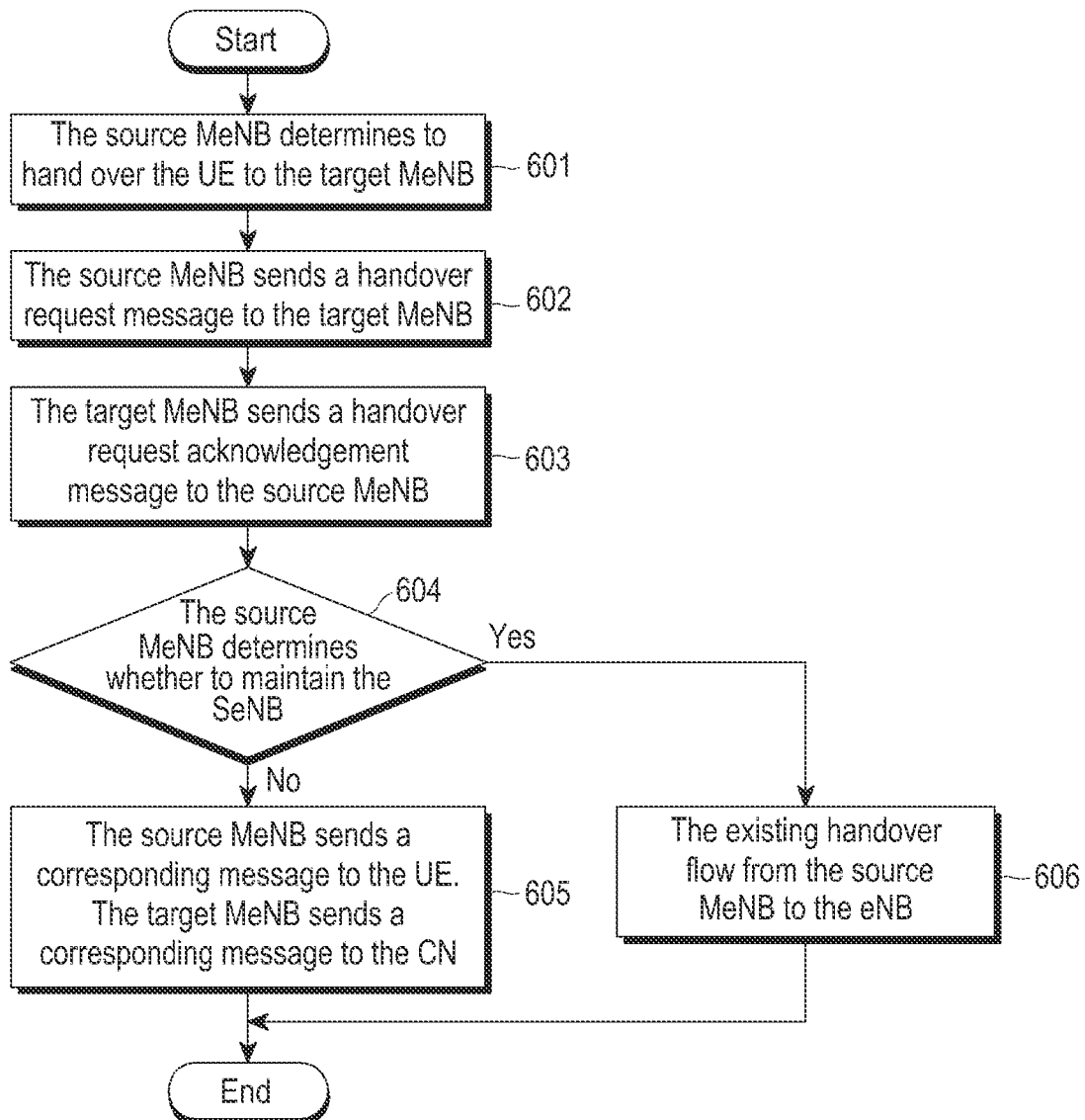
FIG. 6 is a schematic diagram illustrating inter-MeNB handover method four in a small cell system.

FIG. 6 may be a schematic diagram illustrating inter-MeNB handover method four in a small cell system. The main process of the method may include that a target MeNB may notify a source MeNB of whether there is an X2 interface between the target MeNB and an SeNB. The source MeNB may make a determination as to whether to maintain the SeNB. If the source MeNB determines to maintain the SeNB, a corresponding process may be executed to keep the bearer of the UE at the SeNB unreleased in both UE side and network side. Specifically, the method shown in FIG. 6 may include following blocks.

At step 601, the source MeNB may determine to hand over the UE to the target MeNB.

Step 602 may be the same as step 303, without going into the details.

At step 603, the target MeNB may send a handover request acknowledgement message to the source MeNB. The handover request acknowledgement message may include: information indicating whether there is an X2 interface between the target MeNB and the SeNB or information indicating whether it may be feasible to maintain the SeNB. The target MeNB may make a determination as to whether it may be feasible to maintain the SeNB. For instance, if there is an X2 interface between the target MeNB and the SeNB, it may be feasible to maintain the SeNB. If there is no an X2 interface, it may not be feasible to maintain the SeNB. The target MeNB may consider other information, such as O&M configuration when the target MeNB considers whether it is feasible.

The target MeNB may allocate a DL TEID and DL transmission layer address of an S1 interface (an interface between the target MeNB and the SGW) to the bearer handed over to the target MeNB. The target MeNB knows which bearer of the UE is at the SeNB and whether the bearer at the SeNB is split bearer or SCG bearer according to the information of bearer at the SeNB (i.e. which bearer are at the SeNB) and information indicating whether the bearer at the SeNB is the split bearer or the SCG bearer in the handover request message received from the source MeNB at step 602. The target MeNB may allocate a DL TEID and DL transmission layer address of an interface between the target MeNB and SGW to the split bearer. As for the SCG bearer, the target MeNB may not need to allocate the DL TEID and DL transmission layer address to the bearer. As for the bearer, which may be handed over to the target MeNB and in need of data forwarding, the target MeNB may allocate the TEID and transmission layer address of the X2 interface for data forwarding.

The TEID and transmission layer address allocated by the target MeNB to each bearer of the UE may be sent to the source MeNB via the handover request acknowledgement message.

At step 604, the source MeNB may make a determination as to whether to maintain the SeNB. If the source MeNB determines to hand over the bearer at the SeNB to the target MeNB, block 606 may be executed. If the MeNB determines to keep the SeNB unchanged, block 605 may be executed.

The source MeNB may further make a determination as to whether to change the SeNB according to the UE's measurement report and whether there is an X2 interface between the target MeNB and the SeNB or information received from the target MeNB indicating whether it may be feasible to maintain the SeNB. For instance, if the UE's measurement report shows that the signal quality of the Scell at the SeNB is good enough and there is an X2 interface between the target MeNB and the SeNB or it may be feasible to maintain the SeNB, the source MeNB may determine that the SeNB may be kept unchanged. If the UE's measurement report shows that the signal quality of the Scell at the SeNB is not good enough or there is no an X2 interface between the target MeNB and the SeNB or it may not be feasible to maintain the SeNB, the source MeNB may determine to hand over the bearer at the SeNB. The source MeNB may consider other factors (such as O&M configuration) when making the determination without affecting the main content of the present disclosure.

If the source MeNB determines to keep the SeNB unchanged, the source MeNB may notify the target MeNB of maintaining the SeNB. The target MeNB may release the DL TEID and DL transmission layer address of the S1 interface allocated to the SCG bearer and the air interface resource allocated to the SCG bearer.

As for the bearer maintained at the SeNB, the target MeNB may determine to modify the configuration of the bearer of the UE at the SeNB according to the configuration of the bearer of the UE made by the target MeNB and/or UE capability information or other information, etc. If the target MeNB determines to modify the configuration of the bearer at the SeNB, the target MeNB may send an SCG configuration request message to the SeNB. The target MeNB may know the SeNB of the UE according to the cell ID of the Scell of the UE at the SeNB and/or ID of the SeNB in the handover request message at the block 602. The SCG configuration request message may include the ID of the UE at the SeNB, which may be the same as that at step 602, without going into the details. The SCG configuration request message may further include the MeNB UE X2AP ID, which may be allocated by the target MeNB to the UE and used to identify the UE between the target MeNB and SeNB. The SCG configuration request message may be the existing SeNB modification request or a new message. The SCG configuration request message may further include a new key of the UE in the Scell calculated by the target MeNB. The SeNB may send an SCG configuration response message to the target MeNB. The SCG configuration response message may include a Radio Resource Control (RRC) container containing the updated air interface configuration by the SeNB. The SCG configuration response message may further include a SeNB UE X2AP ID, which may be allocated by the SeNB and used to identify the UE between the target MeNB and the SeNB. If the target MeNB receives the RRC container from the SeNB, the target MeNB may send the RRC container received from the SeNB to the source MeNB.

Block 605 may be the same as block 505, without going into the details.

At step 606, the source MeNB may execute other processes of the handover from the source MeNB to the target MeNB and hand over the bearer at the SeNB to the target MeNB. This flow may be the same as the existing handover process from the MeNB to the eNB. For instance, the source MeNB may send a SeNB release request to the SeNB and the source MeNB may send the RRC re-configuration message to the UE, etc. This flow may not be emphasis of the present disclosure. Therefore, detailed technical description may be omitted.

In the method shown in FIG. 6, the source MeNB may make a determination as to whether to maintain the SeNB. In the situation that the SeNB may not be handed over, v, the deletion and re-establishment of the bearer at the SeNB may be avoided, the SGW relocation may be supported and the six technical problems mentioned above may be solved.

The technical scheme of the present disclosure may be further described in detail via several embodiments.

Embodiment One

Figure 7:
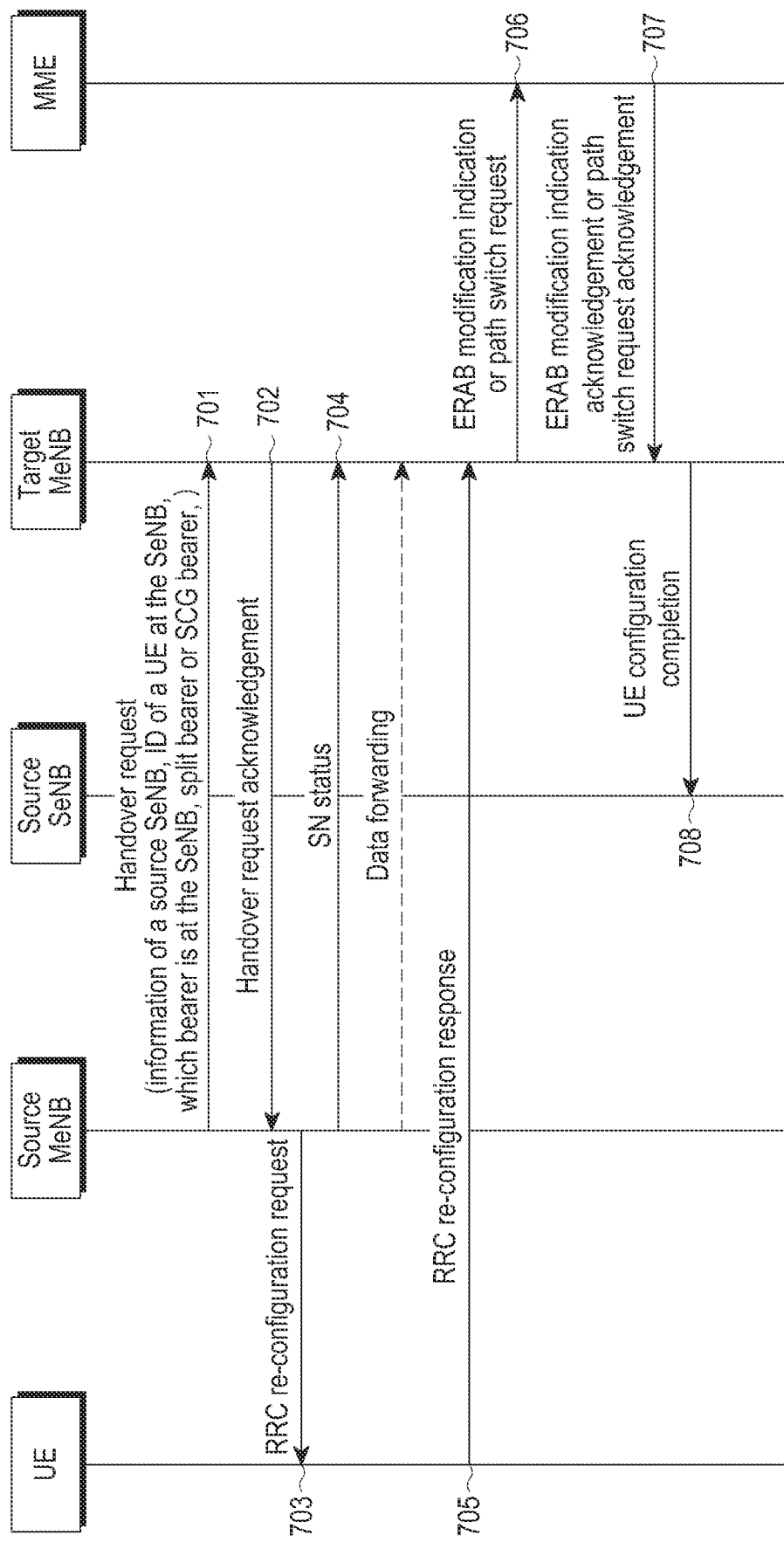
FIG. 7 is a signaling flow in accordance with an embodiment of the present disclosure.

The signaling flow of the embodiment one of the present disclosure may be shown in FIG. 7. The method one to method four in FIGS. 3 to 6 may respectively have described how to make a determination as to whether to maintain the SeNB in detail. Therefore, this embodiment will not describe how to make a determination as to whether to maintain the SeNB in detail. The emphasis of this embodiment may be describing how to solve the problem two to problem six put forwarded in the present disclosure. The flow shown in FIG. 7 may include following steps.

At step 701, a source MeNB may send a handover request message to a target MeNB. The handover request message may include: information of a source SeNB, ID of a UE at the SeNB, bearer of the UE at the SeNB and whether the bearer is split bearer or SCG bearer, etc. This step may be the same as step 303, without going into the details.

For inter-MeNB handover without SeNB change, the source SeNB will also be the target SeNB. Therefore, the source SeNB, the target SeNB and the SeNB has the same meaning i.e. it refers to the secondary eNB that allocate radio resource for the UE over the air interface besides the MeNB before and after inter-MeNB handover.

At step 702, the target MeNB may send a handover request acknowledgement message to the source MeNB.

Corresponding to the method that the target MeNB may make a determination as to whether to keep the SeNB unchanged, the handover request acknowledgement message may further include: information indicating that the SeNB may be kept unchanged.

The target MeNB may allocate a DL TEID and DL transmission layer address of an S1 interface (an interface between the target MeNB and the SGW) to the bearer handed over to the target MeNB.

The target MeNB may know which bearer of the UE is at the SeNB and whether the bearer at the SeNB is the split bearer or SCG bearer according to the information indicating bearer at the SeNB (i.e. which bearer is at the SeNB) and the information indicating whether the bearer at the SeNB is the split bearer or the SCG bearer in the handover request message received from the source MeNB at step 701. The target MeNB may allocate a DL TEID and DL transmission layer address of an interface between the target MeNB and the SGW to the split bearer. As for the SCG bearer, if the target MeNB determines to keep the SeNB unchanged, the target MeNB may not need to allocate DL TEID and DL transmission layer address to the SCG bearer. If the target MeNB determines to hand over the bearer from the SeNB to the target MeNB, the target MeNB may allocate the DL TEID and DL transmission layer address of the S1 interface to the SCG bearer.

As for the bearer, which may be handed over to the target MeNB and in case data forwarding is needed, the target MeNB may allocate the TEID and transmission layer address of the X2 interface used for data forwarding.

The TEID and transmission layer address allocated by the target MeNB to each bearer of the UE may be sent to the source MeNB via the handover request acknowledgement message.

The target MeNB may allocate air interface resource to the bearer handed over to the target MeNB and send the configuration of the air interface to the source MeNB via the RRC container (i.e. the RRC container sent from the target MeNB).

The source MeNB makes the target MeNB know which bearer of the UE is at the SeNB and whether the bearer at the SeNB is split bearer or the SCG bearer via step 701. The target MeNB may know which bearer is kept at the SeNB according to a determination that the bearer at the SeNB is kept unchanged made by the target MeNB or made by the source MeNB and informed by the source MeNB. The target MeNB can correctly configure resource for different bearer of the UE to solve the problem two and problem three put forwarded in the present disclosure.

At step 703, the source MeNB may send an RRC re-configuration message to the UE.

If the SeNB is not handed over, the source MeNB may send the RRC re-configuration message to the UE. And the RRC re-configuration message does not include information instructing the UE to delete the SCG. In the situation that the SeNB may not be handed over, the source MeNB may determine to modify the configuration of the SCG according to the information received from the target MeNB.

If the SeNB is handed over, the source MeNB may instruct the UE to delete the SCG while re-configuring the MCG and establish the bearer in the source SCG to the target MeNB.

At step 704, the source MeNB may send Sequence Number (SN) status to the target MeNB.

The source MeNB may start to perform data forwarding.

In the present disclosure, there may not be an absolute order between block 703 and block 704. That is, the source MeNB may send the SN status to the target MeNB and perform data forwarding first and then send the RRC re-configuration request message to the UE.

At step 705, the UE may send an RRC re-configuration response message to the target MeNB.

At step 706, the target MeNB sends a path switch request or E-RAB modification indication message to the MME.

In a situation that the SeNB may be handed over, the target MeNB may send the path switch request message to the MME. The path switch request message may include the DL TEID and DL transmission layer address allocated by the target MeNB to each bearer handed over to the target MeNB.

In a situation that the SeNB may not be changed and the bearer at the SeNB is the split bearer, the target MeNB may send the path switch request message to the MME. The path switch request message may include the DL TEID and DL transmission layer address allocated by the target MeNB to each bearer.

In a situation that the SeNB may not be changed and the bearer at the SeNB is the SCG bearer, the target MeNB may send an Evolved Universal Terrestrial Radio Access Network (E-UTRAN) Radio Access Bearer (E-RAB) modification indication message to the MME or send an enhanced path switch request message to the MME. The enhanced path switch request message is not the message name Instead, the enhanced path switch request message may be adding a new information element to the existing path switch request message or alternatively the MME behavior is different from the prior art when the MME receives the message. The E-RAB modification indication or the enhanced path switch request message may further include a Tracking Area Identity (TAI) and/or E-UTRAN Cell Global Identifier (ECGI) of the Pcell in the target MeNB. The E-RAB modification indication or the enhanced path switch request message may include a TAI and/or ECGI of the Scell in the SeNB. If the UE has multiple Scells at the SeNB, the E-RAB modification indication or the enhanced path switch request message may further include: multiple TAIs and/or ECGIs.

The E-RAB modification indication message may be used to trigger establishment of UE associated S1 signaling connection between the target MeNB and the MME. The E-RAB modification indication message may include an MME UE S1AP ID of the UE at the MME. The E-RAB modification indication message may include an eNB UE S1AP ID allocated by the target MeNB. The E-RAB modification indication message may include information of bearer to be handed over. The information of bearer maintained at the SeNB may not need to be included in the E-RAB modification indication message. After the MME receives the E-RAB modification indication message, the UE associated S1 signaling connection between the target MeNB and the MME may be established. As for E-RAB which is not included in the E-RAB modification indication message, the MME may maintain the E-RAB unreleased. The MME may send a modify bearer request message to the SGW to request for modifying DL tunnel of the handed over bearer. After the MME receives a modify bearer response message from the SGW, the MME may send an E-RAB modification indication acknowledgement message to the target MeNB. The E-RAB modification indication acknowledgement message may include security context information, which may be used to update a key between the target MeNB and the UE. After the MME receives the E-RAB modification indication message, the MME may further make a determination as to whether to re-select a SGW. When the MME makes the determination as to whether to re-select the SGW, the MME may consider the TAI of the Pcell in the target MeNB, or may consider the TAI of the Pcell of the target MeNB and the TAI of the Scell in the SeNB. If SGW relocation is needed, the MME may send an create session request message to the destination SGW. The create session request message may contain all bearers of the UE which include information of bearer received from the target MeNB which may need to be handed over and information of bearer which may not need to be handed over. The MME may know the information of the bearer, which may not need to be handed over, according to stored UE contexts. The destination SGW may allocate a UL TEID and UL transmission layer address for each bearer. The destination SGW may send a create session response message to the MME. The MME may send an E-RAB modification indication acknowledgement message to the target MeNB. In case of SGW relocation, the E-RAB modification indication acknowledgement message may not only include the UL TEID and UL transmission layer address of the handed over bearer, but also include the UL TEID and UL transmission layer address of the bearer which may not be handed over. Similar to the situation without SeNB relocation, the E-RAB modification indication acknowledgement message may include the security context, which may be used to update the key between the target MeNB and the UE.

The enhanced path switch request may include all the bearers of the UE e.g. the bearer which may need to be handed over and the bearer which may not need to be handed over. After the MME receives the enhanced path switch request, as for the bearer which may not need to be handed over (such as, the TEID and transmission layer address of the bearer have no change) and the MME may not trigger a de-activation process for the bearer. In an alternative, the enhanced path switch request may include indication information, which indicates that the bearer not included in the path switch request message is not released. After the MME receives the enhanced path switch request message, the MME does not trigger the de-activation process of the bearer which is not included in the path switch request message according to the indication information. The MME may send the modify bearer request message to the SGW to request for modifying the handed over bearer. After the MME receives the modify bearer response message from the SGW, the MME may send the path switch request acknowledgement message to the target MeNB. After the MME receives the path switch request message, the MME may further make a determination as to whether to re-select a SGW. When the MME makes the determination as to whether to re-select the SGW, the MME may consider the TAI of the Pcell of the target MeNB, or may consider the TAI of the Pcell of the target MeNB and the Scell of the SeNB simultaneously. If SGW relocation is needed, the MME may send a create session request message to the destination SGW. The create session request message may include all bearers of the UE i.e. the bearer received from the target MeNB which may need to be handed over, and the bearer which may not need to be handed over. The MME may know the information of the bearer, which may not need to be handed over, according to stored UE context. The destination SGW may allocate a UL TEID and UL transmission layer address for each bearer. The destination SGW may send a create session response message to the MME. The MME may send a path switch request acknowledgement message to the target MeNB. In case of SGW relocation, the E-RAB modification indication acknowledgement message may not only include the UL TEID and UL transmission layer address of the handed over bearer, but also include the UL TEID and UL transmission layer address of the bearer which may not be handed over.

At step 707, the MME sends an E-RAB modification indication acknowledgement or path switch request acknowledgement message to the target MeNB.

If the E-RAB modification indication is received at step 706, the E-RAB modification indication acknowledgement may be sent at this step. If the path switch request is received at step 706, the path switch request acknowledgement may be sent at this step.

In case of SGW relocation, the E-RAB modification indication acknowledgement or path switch request acknowledgement message may further include the UL TEID and UL transmission layer address of bearer, which is not handed over.

The source MeNB makes the target MeNB know which bearer of the UE is at the SeNB and whether the bearer at the SeNB is split bearer or SCG bearer via block 701. According to a determination that the bearer at the SeNB is kept unchanged made by the target MeNB or made by the source MeNB and informed by the source MeNB, the target MeNB can send a suitable message to the MME to notify the MME of bearer which need to be handed over and bearer which may not need to be handed over. Therefore, it may be avoided that the MME may falsely release some bearers. In case of SGW relocation is needed, the MME can inform the SGW to allocate the UL TEID and UL transmission layer address to the bearer which may not need to be handed over. Therefore, the problem five and problem six put forwarded in the present disclosure may be solved.

At step 708, the target MeNB may send a UE configuration completion message to the SeNB. The UE configuration completion message may include the MeNB UE X2AP ID between the target MeNB and the SeNB allocated by the target MeNB to the UE.

The UE configuration completion message may include information, which is used by the SeNB to identify the UE. The information, which may be used by the SeNB to identify the UE, may be received from the source MeNB. The information, which is used by the SeNB to identify the UE at the SeNB, may include the cell ID of the Scell at the SeNB and the Cell Radio Network Temporary Identifier (C-RNTI) of the UE in the Scell. If there may be multiple serving Scells at the SeNB, multiple pairs of cell ID of the Scell and C-RNTI may be included in the information, which is used by the SeNB to identify the UE. The information, which is used by the SeNB to identify the UE, may be the SeNB UE X2AP ID of the UE allocated by the SeNB. In case the information, which is used by the SeNB to identify the UE is the SeNB UE X2AP ID, it may further include the ID of the source MeNB and/or the MeNB UE X2AP ID allocated by the source MeNB besides the SeNB UE X2AP ID of the UE allocated by the SeNB.

*204 as for the split bearer, the UE configuration completion message may further include an E-RAB ID, the TEID and transmission layer address allocated by the target MeNB to each bearer.

In case of SGW relocation, as for the SCG bearer, the UE configuration completion message may further include: the UL TEID and UL transmission layer address allocated by a new SGW.

The SeNB may store information received form the target MeNB and delete relevant information of the source MeNB. If the SeNB receives a new Key from the target MeNB, the SeNB may update the used key.

A UE associated X2 signaling connection between the target MeNB and the SeNB may be established with this process.

Optionally, the SeNB may further send the UE configuration completion acknowledgement message to the target MeNB.

The target MeNB may obtain the DL TEID and DL transmission layer address of the X2 interface allocated by the SeNB to the split bearer via two methods.

Method one: The source MeNB may notify the target MeNB of the DL TEID and DL transmission layer address of the X2 interface allocated by the SeNB to the split bearer via block 701.

Method two: the SeNB may send the DL TEID and DL transmission layer address of the X2 interface allocated by the SeNB to the split bearer via the UE configuration completion acknowledgement message.

The source MeNB makes the target MeNB know the SeNB of the UE and information at the SeNB for identifying the UE at the SeNB via block 701. So the target MeNB can send a message to a correct SeNB. The target MeNB sends the information for identifying the UE at the SeNB to the SeNB. The SeNB can know for which UE there is inter-MeNB handover. The SeNB may perform correct bearer modification and deletion to solve the problem four put forwarded in the present disclosure.

Various problems in the inter-MeNB handover process may be solved via this embodiment, to make the inter-MeNB handover without SeNB change feasible.

Embodiment Two

Figure 8:
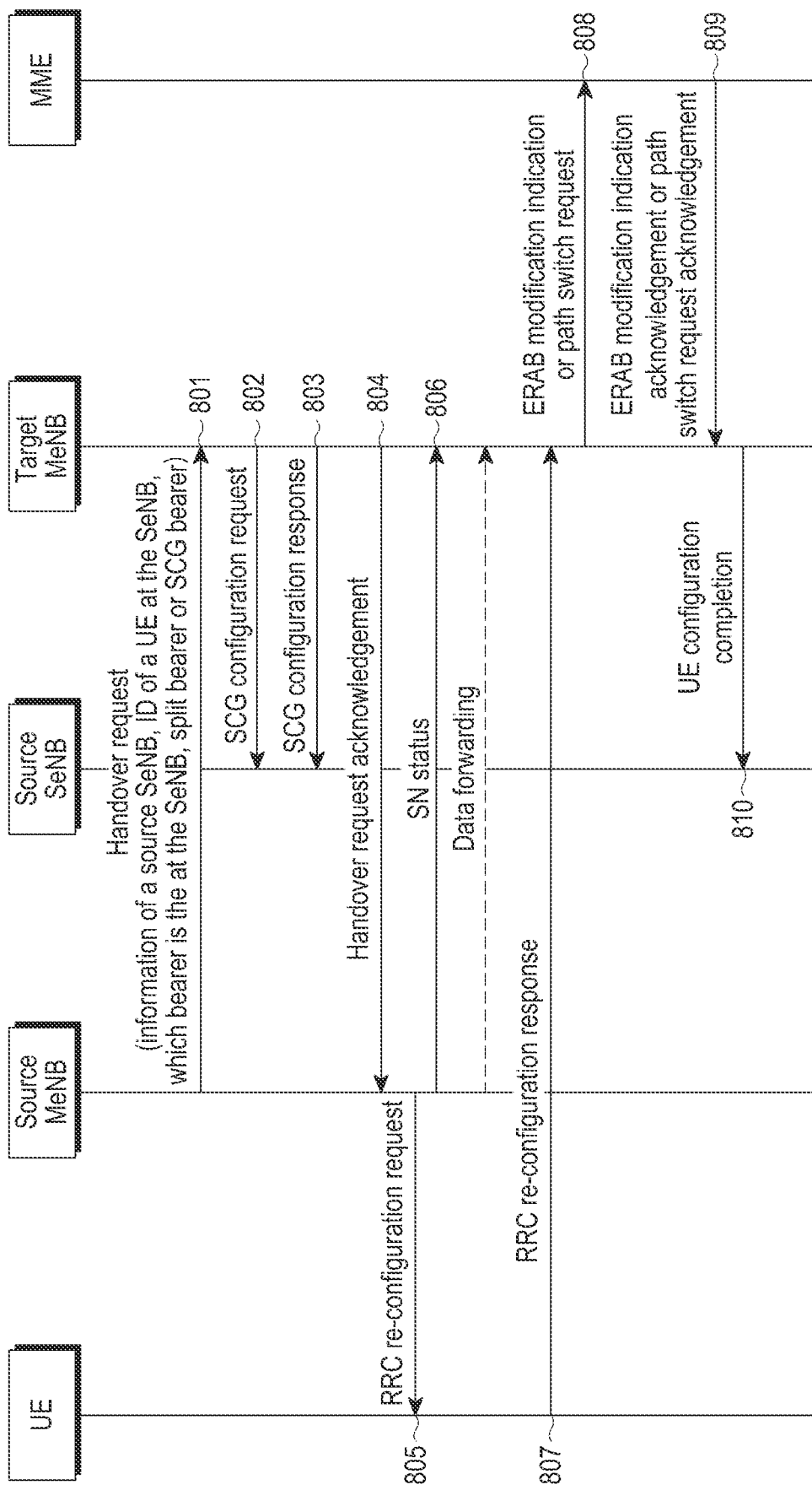
FIG. 8 is a signaling flow chart in accordance with an embodiment of the present disclosure.

The signaling flow of the embodiment two of the present disclosure may be shown in FIG. 8. The method one to method four in FIGS. 3 to 6 may respectively have described how to make a determination as to whether to maintain the SeNB in detail. Therefore, this embodiment will not describe how to make a determination as to whether to maintain the SeNB in detail. The emphasis of this embodiment may be describing how to solve the problem two to problem six put forwarded in the present disclosure. The flow shown in FIG. 8 may include following steps.

At step 801, a source MeNB sends a handover request message to a target MeNB. The handover request message may include: information of a source SeNB, ID of a UE at the SeNB, bearer of the UE at the SeNB and/or whether the bearer is split bearer or SCG bearer. This step is the same as step 303, without going into the details.

For inter-MeNB handover without SeNB change, the source SeNB will also be the target SeNB. Therefore, the source SeNB, the target SeNB and the SeNB has the same meaning i.e. it refers to the secondary eNB that allocate radio resource for the UE over the air interface besides the MeNB before and after inter-MeNB handover.

At step 802, the target MeNB sends an SCG configuration request to the SeNB. The target MeNB can know the SeNB of the UE according to the ID of the SeNB or the cell ID of the Scell in the SeNB received at step 801.

The target MeNB may calculate a new Key for the UE at the SeNB and the target MeNB may send the new Key of the UE to the SeNB via the SCG configuration request.

The SCG configuration request may include information which is used by the SeNB to identify the UE. Therefore, The SeNB can know for which UE there is inter-MeNB handover. The information, which is used by the SeNB to identify the UE, may be received from the source MeNB. The specific information is the same as that described at step 708, without going into the details.

The target MeNB may modify the configuration of the bearer at the SeNB via the SCG configuration request message.

The SCG configuration may be a new message or may be implemented via enhancing the existing SeNB modification request procedure.

The UE associated X2 signaling connection between the target MeNB and the SeNB may be established via the SCG configuration message.

The source MeNB makes the target MeNB know the SeNB of the UE and information at the SeNB for identifying the UE at the SeNB via step 801. The target MeNB sends a message to a correct SeNB and sends the information for identifying the UE at the SeNB to the SeNB. The SeNB can know for which UE there is inter-MeNB handover. The SeNB performs correct modification and deletion to solve the problem four put forwarded in the present disclosure.

At step 803, the SeNB sends an SCG configuration response message to the target MeNB.

The SCG configuration response message may include a SeNB X2AP ID between the SeNB and target MeNB allocated by the SeNB.

This embodiment may include this block or may not include this block.

If a SeNB modification request is sent at step 802, a SeNB modification request acknowledgement may be sent at this step.

If the configuration of the bearer at the SeNB is modified, the SeNB may send re-configuration information over the air interface to the target MeNB via carrying the RRC container (i.e. the RRC container sent from the SeNB) in the SCG configuration response.

The SCG configuration response message may include the information to indicate that the UE context is kept. The UE context is kept doesn't exclude that the UE context may be updated. The SeNB behavior may be different when the SeNB receives SCG configuration request message, e.g. for Rel-13 SeNB, the SeNB keeps the UE context and may update some information or update some bearer configuration, while for Rel-12 SeNB, the SeNB creates UE context according to the information received in SCG configuration request message and configure bearers. If the SeNB keeps the UE context, the SeNB includes the indication information of keeping UE context in SCG configuration response message.

At step 804, the target MeNB sends a handover request acknowledgement message to the source MeNB. Corresponding to the method that the target MeNB may make a determination as to whether to keep the SeNB unchanged, the handover request acknowledgement message may further include: information indicating that the SeNB may be kept unchanged.

The source MeNB may decide not to trigger SeNB release and/or UE context release procedure. In case the source MeNB receives the information indicating that the SeNB may be kept unchanged from the target MeNB, the source MeNB may not trigger SeNB release and/or UE context release procedure.

The target MeNB may allocate a DL TEID and transmission layer address over an S1 interface (an interface between the target MeNB and the SGW) for the bearer handed over to the target MeNB.

The target MeNB may know which bearer of the UE is at the SeNB and whether the bearer at the SeNB is the split bearer or SCG bearer according to the information indicating bearer at the SeNB (i.e. which bearer is at the SeNB) and the information indicating whether the bearer at the SeNB is the split bearer or the SCG bearer in the handover request message received from the source MeNB at step 801. The target MeNB may allocate a DL TEID and DL transmission layer address of an interface between the target MeNB and SGW to the split bearer. As for the SCG bearer, if the target MeNB decides to keep the SeNB unchanged, the target MeNB may not need to allocate DL TEID and DL transmission layer address to the SCG bearer. If the target MeNB decides to hand over the bearer at the SeNB to the target MeNB, the target MeNB may allocate the DL TEID and DL transmission layer address of the S1 interface to the SCG bearer.

As for the bearer, which may be handed over to the target MeNB and in case data forwarding is needed, the target MeNB may allocate the TEID and transmission layer address of the X2 interface used for data forwarding.

The TEID and transmission layer address allocated by the target MeNB to each bearer of the UE may be sent to the source MeNB via the handover request acknowledgement message.

The target MeNB may allocate air interface resource to the bearer handed over to the target MeNB and send the configuration of the air interface to the source MeNB via the RRC container (i.e. the RRC container sent from the target MeNB).

If the bearer at the SeNB is re-configured, the target MeNB may send the RRC container (i.e. the RRC container sent from the SeNB) received from the SeNB to the source MeNB.

The source MeNB makes the target MeNB know which bearer of the UE is at the SeNB and whether the bearer at the SeNB is the split bearer or the SCG bearer via block 801. The target MeNB may know which bearer is kept at the SeNB according to a determination that the bearer at the SeNB is kept unchanged made by the target MeNB or made by the source MeNB and informed by the source MeNB. The target MeNB may correctly configure resource for different bearer of the UE to solve the problem two and problem three put forwarded in the present disclosure.

If the target MeNB receives the indication information of keeping UE context from the SeNB, the target MeNB sends the information to the source MeNB. The target MeNB sends the indication information of keeping UE context to the source MeNB by handover request acknowledge message. The source MeNB decides whether trigger UE context release in SeNB based on the received information. For example, the source MeNB does not trigger SeNB release and/or UE context release if the source MeNB receives the indication information of keeping UE context. If the source MeNB doesn't receive the indication information of keeping UE context and/or the information of keeping SeNB unchanged, the source MeNB may trigger the SeNB release and/or UE context release procedure.

At step 805, the source MeNB may send an RRC re-configuration message to the UE.

If the SeNB is not handed over, the source MeNB may send the RRC re-configuration message to the UE and the RRC re-configuration message does not include information instructing the UE to delete the SCG. In the situation that the SeNB may not be handed over, the source MeNB may determine to modify the configuration of the SCG according to the information received from the target MeNB. The source MeNB may send a RRC container received from the target MeNB which is constructed by the SeNB to the UE. At the same time, the source MeNB may send a second RRC container received from the target MeNB which is constructed by the target MeNB to the UE. The former container may include the re-configuration information of the bearer at the SeNB and the latter container may include the configuration information of the bearer handed over to the target MeNB.

If the SeNB is handed over, the source MeNB may instruct the UE to delete the SCG while re-configuring the MCG and establish the bearer at the source SCG to the target MeNB.

At step 806, the source MeNB may send SN status to the target MeNB.

The source MeNB may start to perform data forwarding.

In the present disclosure, there may not be an absolute order between block 805 and block 806. That is, the source MeNB may send the SN status to the target MeNB and perform data forwarding first and then send the RRC re-configuration message to the UE.

Step 807 to step 809 may be the same as block 705 to 707, without going into the details.

At step 810, the target MeNB may send a UE configuration completion message to the SeNB. The UE configuration completion message may include the MeNB UE X2AP ID between the target MeNB and the SeNB allocated by the target MeNB to the UE.

The UE configuration completion message may further include a SeNB X2AP ID between the SeNB and target MeNB allocated by the SeNB.

As for the split bearer, the UE configuration completion message may further include an E-RAB ID, the TEID and transmission layer address allocated by the target MeNB to each bearer.

In case of SGW relocation, as for the SCG bearer, the UE configuration completion message may further include: an E-RAB ID of the SCG, the UL TEID and UL transmission layer address allocated by a new SGW.

The SeNB may store information received from the target MeNB and delete relevant information of the source MeNB.

Optionally, the SeNB may further send the UE configuration completion acknowledgement message to the target MeNB.

The target MeNB may obtain the DL TEID and DL transmission layer address of the X2 interface allocated by the SeNB to the split bearer via two methods.

Method one: The source MeNB may notify the target MeNB of the DL TEID and DL transmission layer address of the X2 interface allocated by the SeNB to the split bearer via block 801.

Method two: the SeNB may send the DL TEID and DL transmission layer address of the X2 interface allocated by the SeNB to the split bearer via the UE configuration completion acknowledgement message.

Various problems in the inter-MeNB handover process may be solved via this embodiment, to make inter-MeNB handover without SeNB change feasible.

Embodiment Three

Figure 9:
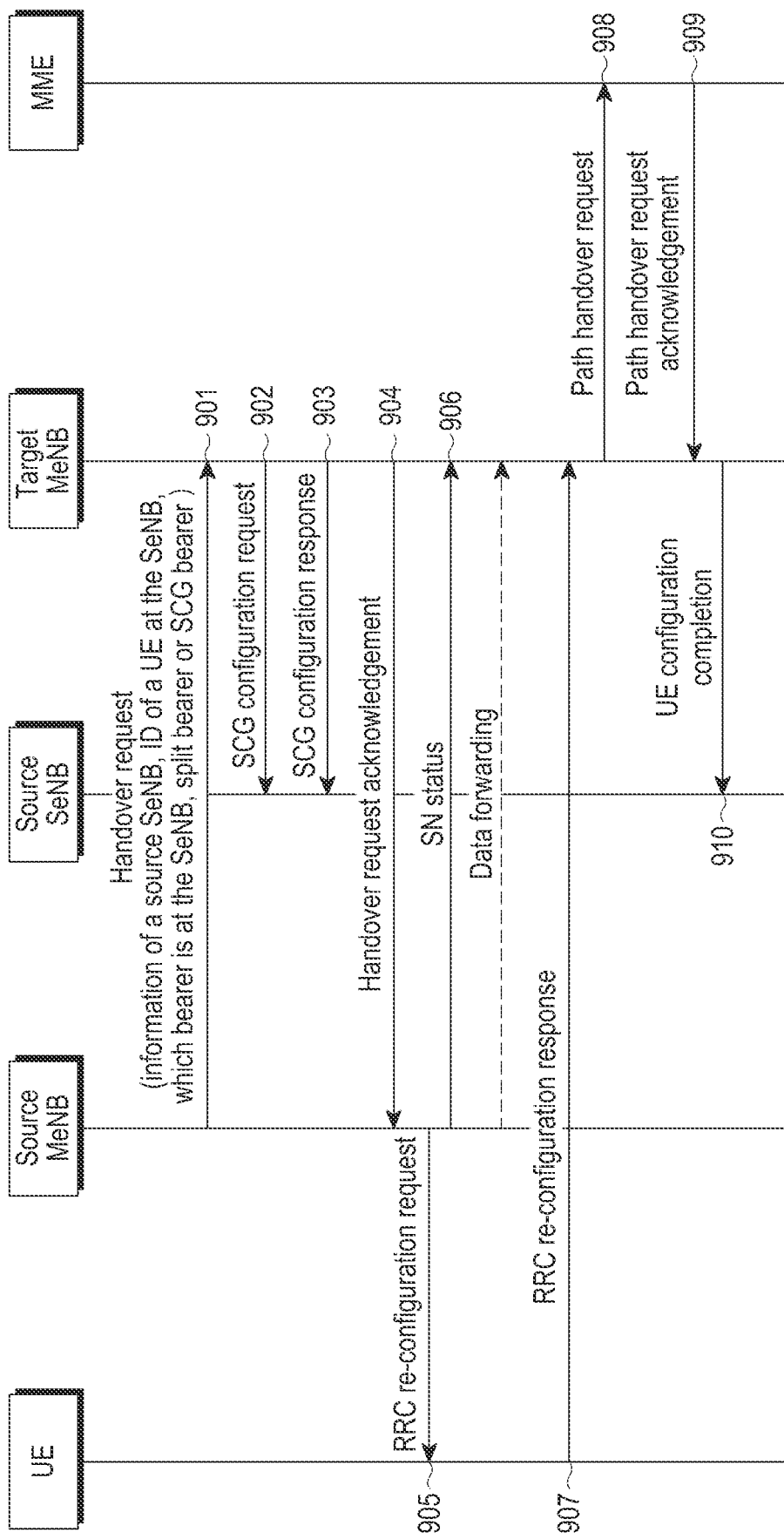
FIG. 9 is a signaling flow chart in accordance with an embodiment of the present disclosure.

The signaling flow of the embodiment three of the present disclosure may be shown in FIG. 9. The method one to method four in FIGS. 3 to 6 may respectively have described how to make a determination as to whether to maintain the SeNB in detail. Therefore, this embodiment will not describe how to make a determination as to whether to maintain the SeNB in detail. The emphasis of this embodiment may be describing how to solve the problem two to problem six put forwarded in the present disclosure. The flow shown in FIG. 9 may include following blocks.

At step 901, a source MeNB may send a handover request message to a target MeNB. This step is the same as at step 303, without going into the details.

For inter-MeNB handover without SeNB change, the source SeNB will also be the target SeNB. Therefore, the source SeNB, the target SeNB and the SeNB has the same meaning i.e. it refers to the secondary eNB that allocate radio resource for the UE over the air interface besides the MeNB before and after inter-MeNB handover.

At step 902, the target MeNB may send an SCG configuration request to the SeNB. This step is the same as step 802, without going into the details.

At step 903, the SeNB may send an SCG configuration response message to the target MeNB.

The SCG configuration response message may include a SeNB X2AP ID between the SeNB and target MeNB allocated by the SeNB.

The SeNB may re-allocate the TEID and/or transmission layer address to the bearer at the SeNB. That is, the SeNB may allocate a new TEID and/or transmission layer address, release the original TEID and/or transmission layer address and send the TEID and/or transmission layer address corresponding to each E-RAB ID to the target MeNB via the SCG configuration response message. The newly-allocated TEID and/or transmission layer address may only be allocated for the SCG bearer at the SeNB.

If a SeNB modification request is sent at step 902, a SeNB modification request acknowledgement may be sent at this step.

If the configuration of the bearer at the SeNB is modified, the SeNB may send re-configuration information of the air interface to the target MeNB via carrying the RRC container (i.e. the RRC container sent from the SeNB) in the SCG configuration response.

The SCG configuration response message may include the information to indicate that the UE context is kept. The UE context is kept doesn't exclude that the UE context may be updated. The SeNB behavior may be different when the SeNB receives SCG configuration request message, e.g. for Rel-13 SeNB, the SeNB keeps the UE context and may update some information or update some bearer configuration, while for Rel-12 SeNB, the SeNB creates UE context according to the information received in SCG configuration request message and configure bearers. If the SeNB keeps the UE context, the SeNB includes the indication information of keeping UE context in SCG configuration response message.

At step 904, the target MeNB may send a handover request acknowledgement message to the source MeNB.

Corresponding to the method that the target MeNB may determine to keep the SeNB unchanged, the handover request acknowledgement message may further include: information indicating that the SeNB is kept unchanged.

The source MeNB may decide not to trigger SeNB release and/or UE context release procedure. In case the source MeNB receives the information indicating that the SeNB may be kept unchanged from the target MeNB, the source MeNB may not trigger SeNB release and/or UE context release procedure.

The target MeNB may allocate a DL TEID and DL transmission layer address of an S1 interface (an interface between the target MeNB and the SGW) to the bearer handed over to the target MeNB.

According to information indicating which bearer is at the SeNB and information indicating whether the bearer at the SeNB is the split bearer or the SCG bearer in the handover request message received from the source MeNB at step 901, the target MeNB can know which bearer of the UE is at the SeNB and whether the bearer at the SeNB is the split bearer or SCG bearer. The target MeNB may allocate a DL TEID and DL transmission layer address of an interface between the target MeNB and SGW to the split bearer. As for the SCG bearer, if the target MeNB determines to keep the SeNB unchanged, the target MeNB may not need to allocate DL TEID and DL transmission layer address to the SCG bearer. The target MeNB may send the TEID and/or transmission layer address, which may be re-allocated by the SeNB and received from the SeNB at step 903 to the source MeNB. If the target MeNB determines to handover the bearer at the SeNB to the target MeNB, the target MeNB may allocate the DL TEID and transmission layer address of the S1 interface to the bearer.

As for the bearer that are handed over to the target MeNB and in case data forwarding is needed, the target MeNB may allocate the TEID and transmission layer address of the X2 interface for data forwarding.

The TEID and transmission layer address allocated by the target MeNB to each bearer of the UE may be sent to the source MeNB via the handover request acknowledgement message. As for the SCG bearer, the target MeNB may send the TEID and/or transmission layer address re-allocated by the SeNB to the source MeNB via a handover request acknowledgement message.

The target MeNB may allocate air interface resource to the bearer handed over to the target MeNB and send the configuration of the air interface to the source MeNB via the RRC container (i.e. the RRC container from the target MeNB).

If the bearer at the SeNB are re-configured, the target MeNB may send the RRC container (i.e. the RRC container from the SeNB) received from the SeNB to the source MeNB.

The source MeNB makes the target MeNB know which bearer of the UE is at the SeNB and whether the bearer at the SeNB is the split bearer or the SCG bearer via block 901. The target MeNB can know which bearer may be kept at the SeNB according to a determination that the bearer at the SeNB is kept unchanged made by the target MeNB or made by the source MeNB and informed by the source MeNB. The target MeNB can correctly configure resource for different bearer of the UE to solve the problem two and problem three put forwarded in the present disclosure.

If the target MeNB receives the indication information of keeping UE context from the SeNB, the target MeNB sends the information to the source MeNB. The target MeNB sends the indication information of keeping UE context to the source MeNB by handover request acknowledge message. The source MeNB decides whether trigger UE context release in SeNB based on the received information. For example, the source MeNB does not trigger SeNB release and/or UE context release if the source MeNB receives the indication information of keeping UE context. If the source MeNB doesn't receive the indication information of keeping UE context and/or the information of keeping SeNB unchanged, the source MeNB may trigger the SeNB release and/or UE context release procedure.

Block 905 to block 907 may be the same as block 805 to 807, without going into the details.

At step 908, the target MeNB may send the path switch request message to the MME. The path switch request message may include the information of the bearer handed over from the source MeNB to the target MeNB. As for the SCG bearer, since the DL TEID and/or DL transmission layer address of the SCG bearers may be re-allocated by the SeNB, the path switch request message may further include the information of SCG bearer, which may be maintained at the SeNB and may not be handed over.

At step 909, the MME may send the path switch request acknowledgement message to the target MeNB.

Block 910 may be the same as block 810, without going into the details.

Various problems in the inter-MeNB handover process may be solved via this embodiment, to make inter-MeNB handover without SeNB change feasible.

Figure 10:
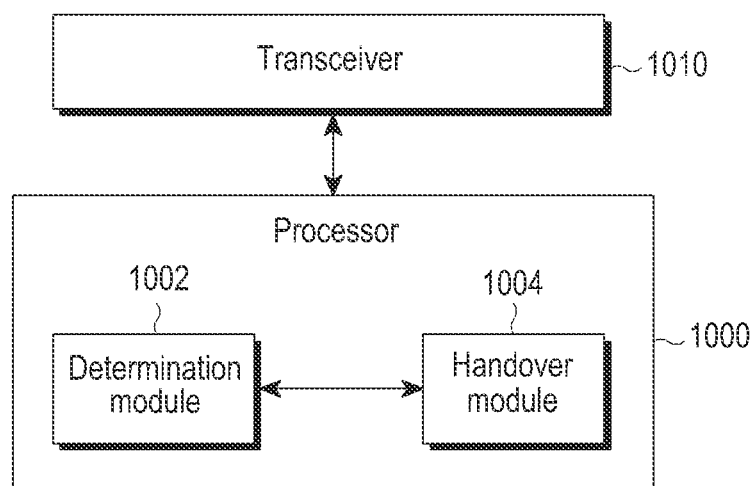
FIG. 10 is a schematic diagram illustrating structure of a preferred inter-MeNB handover device in a small cell system in accordance with an example of the present disclosure.

Corresponding to the above method, an example of the present disclosure may further provide an inter-MeNB handover device in a small cell system. As shown in FIG. 10, the device may include: a processor 1000 and a transceiver 1010. The processor 1000 may control all of the operations performed by the inter-MeNB handover device. The processor 1000 may include: a determination module 1002 and a handover module 1004. The determination module 1002 may be to make a determination as to whether to maintain a SeNB when handover is performed. The handover module 1004 may be to trigger different handover processes according to a result of the determination as to whether to maintain the SeNB.

The transceiver 1010 may be configured to communicate at least a signal with other communication device or an entity in the small cell system.

However, the controller 1000 and the transceiver 1010 are not necessarily implemented as separate devices, respectively, but may be implemented in a single unit in the form of, e.g., a single chip.

The foregoing description may only describe preferred embodiments of the present invention and may not be used for limiting the protection scope thereof Any modification, equivalent substitution, or improvement made without departing from the spirit and principle of the present invention should be covered by the protection scope of the present invention.

The invention claimed is:

1. A target master node (MN) for performing an inter-MN handover without a change of a secondary node (SN), the target MN comprising:
    a transceiver; and
    a controller coupled with the transceiver and configured to control to:
        receive, from a source MN, a handover request message, wherein the handover request message comprises an identity (ID) of a user equipment (UE) allocated at the SN and an ID of the SN,
        send, to the SN, a request message associated with the SN including the ID of the UE allocated at the SN and an ID of the UE allocated at the target MN,
        receive, from the SN, a request acknowledge message for the request message,
        send, to the source MN, a handover request acknowledge message including information indicating that a UE context in the SN is kept,
        send, to the SN, a configuration completion message,
        send, to a mobility management related entity, a path switch request message, and
        receive, from the mobility management related entity, a path switch request acknowledge message,
    wherein the ID of the UE allocated at the SN is application protocol ID of the UE over an interface between the source MN and the SN.

2. The target MN according to claim 1,
    wherein the configuration completion message comprises:
        an ID of the UE allocated at the target MN, and
        the ID of the UE allocated at the SN, and
    wherein the ID of the UE allocated at the target MN is application protocol ID of the UE over an interface between the target MN and the SN.

3. The target MN according to claim 1,
    wherein the request message further includes a key associated with security, and
    wherein the ID of the UE allocated at the target MN is application protocol ID of the UE over an interface between the target MN and the SN.

4. The target MN according to claim 1, wherein the handover request message comprises an ID of the mobility management related entity.

5. The target MN according to claim 1, wherein whether to keep the UE context in the SN is determined by the target MN.

6. A source master node (MN) for performing an inter-MN handover without a change of a secondary node (SN), the source MN comprising:
    a transceiver; and
    a controller coupled with the transceiver and configured to control to:
        send, to a target MN, a handover request message, wherein the handover request message comprises an identity (ID) of a user equipment (UE) allocated at the SN and an ID of the SN,
        receive, from the target MN, a handover request acknowledge message including information indicating that a UE context in the SN is kept, and
        send, to the UE, a radio resource control (RRC) reconfiguration message for handover to the target MN,
    wherein the ID of the UE allocated at the SN is application protocol ID of the UE over an interface between the source MN and the SN.

7. The source MN according to claim 6,
    wherein handover request acknowledge message further includes the ID of the UE allocated at the SN and the ID of the UE allocated at the target MN, and
    wherein the ID of the UE allocated at the target MN is application protocol ID of the UE over an interface between the target MN and the SN.

8. The source MN according to claim 6, wherein the handover request message comprises an ID of a mobility management related entity.

9. The source MN according to claim 6, wherein whether to keep the UE context in the SN is determined by the target MN.

10. A method of a source master node (MN) for performing an inter-MN handover without a change of a secondary node (SN), the method comprising:
- sending, to a target MN, a handover request message, wherein the handover request message comprises an identity (ID) of a user equipment (UE) allocated at the SN and an ID of the SN;
- receiving, from the target MN, a handover request acknowledge message including information indicating that a UE context in the SN is kept; and
- sending, to the UE, a radio resource control (RRC) reconfiguration message for handover to the target MN,
- wherein the ID of the UE allocated at the SN is application protocol ID of the UE over an interface between the source MN and the SN.

11. The method according to claim 10,
- wherein handover request acknowledge message further includes the ID of the UE allocated at the SN and the ID of the UE allocated at the target MN, and
- wherein the ID of the UE allocated at the target MN is application protocol ID of the UE over an interface between the target MN and the SN.

12. The method according to claim 10, wherein the handover request message comprises an ID of a mobility management related entity.

13. The method according to claim 10, wherein whether to keep the UE context in the SN is determined by the target MN.

* * * * *